(12) United States Patent
Serino

(10) Patent No.: US 10,134,061 B2
(45) Date of Patent: Nov. 20, 2018

(54) COLLAGE-BASED, INTEGRATED ADVERTISING SYSTEMS AND METHODS OF ADVERTISING

(71) Applicant: Joseph M. Serino, Rutherford, NJ (US)

(72) Inventor: Joseph M. Serino, Rutherford, NJ (US)

( * ) Notice: Subject to any disclaimer, the term of this patent is extended or adjusted under 35 U.S.C. 154(b) by 622 days.

(21) Appl. No.: 13/844,805

(22) Filed: Mar. 16, 2013

(65) Prior Publication Data

US 2014/0279072 A1 Sep. 18, 2014

(51) Int. Cl.

| | |
|---|---|
| *G06Q 30/02* | (2012.01) |
| *G09F 15/00* | (2006.01) |
| *G09F 9/30* | (2006.01) |
| *G09F 7/00* | (2006.01) |

(52) U.S. Cl.
CPC .......... *G06Q 30/0277* (2013.01); *G09F 7/00* (2013.01); *G09F 9/30* (2013.01); *G09F 15/00* (2013.01)

(58) Field of Classification Search
CPC .... G06Q 30/00; G06Q 30/02; G06Q 30/0241; G06Q 30/0277
USPC .................... 705/7.11, 14.51, 14.41; 715/767
See application file for complete search history.

(56) References Cited

U.S. PATENT DOCUMENTS

| | | | | |
|---|---|---|---|---|
| 2004/0254853 | A1* | 12/2004 | Heene ................ | G06Q 30/0253 705/14.51 |
| 2008/0126152 | A1* | 5/2008 | Villanueva et al. ............. | 705/7 |
| 2008/0313036 | A1* | 12/2008 | Mosko .................. | G06Q 20/10 705/14.41 |
| 2009/0132943 | A1* | 5/2009 | Minsky et al. ............... | 715/767 |
| 2013/0046637 | A1* | 2/2013 | Slutsky .............. | G06Q 30/0269 705/14.66 |

* cited by examiner

*Primary Examiner* — Marilyn G Macasiano
(74) *Attorney, Agent, or Firm* — Hoang Steve Ngo

(57) ABSTRACT

Collage-based, integrated advertising systems and methods of advertising are disclosed.

57 Claims, 16 Drawing Sheets

COLLAGE-BASED, INTEGRATED ADVERTISING SYSTEMS AND METHODS OF ADVERTISING

BACKGROUND OF THE INVENTION

Field of the Invention

The present invention relates generally to marketing and advertising. More specifically, the present invention relates to collage-based, integrated advertising systems and methods of advertising.

Description of the Prior Art

Over time a rich and varied array of print and electronic media strategies, production techniques and publication forms have been used by product manufacturers, advertising agencies and publishers to stimulate product sales. Image advertising is employed to grasp prospect attention and install and reinforce brand attributes. Sales promotion techniques, including, discount coupons, sweepstakes, contests, gaming, sampling, in/on packs, and enhanced display entice engagement. Database marketing tracks and stores information about sales completed and/or interactions achieved. Customer relationship management (CRM) develops and coordinates on-going, messaging, loyalty and related programs.

The present invention is a new commercial communication vehicle that permits an array of marketing techniques to be delivered simultaneously and in conjunction, via a hybrid, cooperatively, co-sponsored, interactive print and electronic publication, which combines known artistic disciplines, marketing techniques and technologies into a poster and Internet website and/or virtual presence or online presence, which utilizes the collage design technique, allowing participating product marketers, to gain association and cost efficiency benefits, through this new, unique and novel, unified interface, trans-medium, promotional messaging development and delivery system.

As a main component of an embodiment of the present invention is the poster medium, a brief descriptive history of which appears following. (*Source: Adapted from www.wetCanvas.com*)

A poster is a large piece of printed matter designed to be attached to a wall or vertical surface. Typically posters include textual and graphic elements, but may be all graphics or all text. Posters are designed to be eye-catching and to convey information. They are used for many purposes, and are used frequently by advertisers, propagandists, protestors and other groups trying to communicate a message. Posters are also used for reproductions of artwork and educational purposes.

The posters medium as an information source can be traced as far back to the 15th century, when each sheet was handmade by artisans to provide news, announcements, and other information to the populous, which began a replacement of the town crier who would traverse the streets and announced royal, religious and trade orders and proclamations, goods for sale, local events, burials, etc., at town crossroads.

In 1628, Parisian physician Théophraste Renaudot created his "Bureau d'adresses", a listing of small advertisements indexing suppliers and buyers of various products. In 1633, he printed loose sleeves reproducing this information under the name of "*Sheets of the Bureau d'adresses*" and created the first advertising poster.

In 1798, the lithographic printing press allowed mass production of all shapes and sizes of posters. By 1848, it was possible to print 10,000 sheets per hour. Jules Cheret, "the father of the poster", was the first person to mass produce the medium, giving the medium its own aesthetic identity and autonomy from other fields of pictorial art.

In 1867, the age of the artistic commercial poster was born when Cheret's print shop produced the first poster of Sarah Bernardt as Princess Desiree in the comedy La Biche au Bois, for Bal Valentino. Cheret almost single handedly turned Paris into the "picture gallery of the street." In 1881 or 1895, a law was passed which created official "posting places", and an entire industry was created. Every poster required a tax stamp to indicate that a fee had been paid for the right to post it. Based on square footage, the tax led to the adoption of standard sizes. Advertisers worked with artists, printers and posting companies to create, post and maintain street posters. As result of the most prominent poster artists moving to other fields of research and work the poster as an artistic medium began faded after 1900.

Poster Collage Prior Art

As the collage design technique is also a central component of the current invention, a brief overview to the medium follows. (Adapted from http://en.wikipedia.org/wiki/Collage).

Collage (from the French, coller, to glue) is a work of formal art, primarily in the visual arts, made from an assemblage of different elements, material, and forms to create a new multidisciplinary whole.

Techniques of collage were first used at the time of the invention of paper in China, around 200 BC. The use of collage, however, remained very limited until the 10th century in Japan, when calligraphers began to apply glued paper, using texts on surfaces, when writing their poems. The technique of collage appeared in medieval Europe during the 13th century. Gold leaf panels started to be applied in Gothic cathedrals around the 15th and 16th centuries. Gemstones and other precious metals were applied to religious images, icons, and also, to coats of arms. In the 19th century, collage methods also were used among hobbyists for memorabilia (i.e. applied to photo albums) and books (i.e. Hans Christian Andersen, Carl Spitzweg).

Despite the pre-twentieth-century use of collage-like application techniques, some art authorities argue that collage, properly speaking, did not emerge until after 1900, in conjunction with the early stages of modernism. For example, the Tate Gallery's online art glossary states that collage "was first used as an artists' technique in the twentieth century." According to the Guggenheim Museum's online art glossary, collage is an artistic concept associated with the beginnings of modernism, and entails much more than the idea of gluing something onto something else. The glued-on patches which Braque and Picasso added to their canvases offered a new perspective on painting when the patches "collided with the surface plane of the painting." In this perspective, collage was part of a methodical reexamination of the relation between painting and sculpture, and these new works "gave each medium some of the characteristics of the other." Collage in the modernist sense began with Cubist painters Georges Braque and Pablo Picasso.

The twentieth century printing related derivative of the collage design technique, is photomontage created in a process of making a composite photograph by cutting and joining a number of other photographs. The composite picture is sometimes photographed so that the final image is converted back into a seamless photographic print. Today's photomontage is often performed with the use of digital software programs.

In the decade of the 1980s, New York-based Paper magazine sometimes published a local black & white magazine in a folded poster format that frequently incorporated collage design, providing the name and address of the local retail business establishment where the product could be purchased.

Poster Publication Prior Patents

Concerning patented poster publications Trikillas U.S. Pat. No. 4,538,833, Sep. 3, 1985 for a Publication, Kelly's U.S. Pat. No. 4,487,431, Dec. 11, 1984 for a Publication Convertible to Poster, and Hollander's U.S. Pat. No. 5,234,832, Aug. 10, 1993 for Poster & Catalog, all present innovations related to the poster medium, but none claims/includes the elements of co-sponsored imagery, the offering of multiple promotional types on a single vehicle, at least note as a core component of the medium. Also none of these patents mentions links to any form of online presence, or makes any reference to database marketing techniques.

As indicated there exists considerable prior art regarding the application of collage and photomontage to the poster medium and commercial art. However, no prior art reveals a situation, scenario, process or mechanism or device, where multiple, paid sponsored elements, are combined to create an cooperative, unified image collage, where elements of the sponsored collage are used to create a multimedia publication, composed and comprised of a print poster, and a corresponding, message extending and deepening Internet presence website and/or virtual presence or online presence, wherein the sponsored elements are also simultaneously components of the websites website and/or virtual presence or online presence navigation, and wherein the elements of the sponsored collage are also used as part of an interactive promotional activity, and wherein the sponsored collage-based poster, website and/or virtual presence or online presence and navigational components—in combination—are the attention generating, awareness raising, message enhancing and interface operating elements, employed for the purpose of enrolling members of a target audience, into an electronic, interactive messaging system that utilizes user tracking, database gathering, computer server based storage, data analysis and manipulation methods as key elements in an on-going marketing communications outreach effort(s).

Coupon Patents

As an element of the current invention involves the distribution of promotional offers including discount coupons, a review of couponing prior art reveals, Washburn's U.S. Pat. No. 3,032,904, May 8, 1962, for Coupon Calendar, and Morton's U.S. Pat. No. 4,195,864 Apr. 1, 1980 for a Multi Product Coupon. Both are similar to the current invention with regard to delivering a variety discount price promotional offers from a group of cooperating marketers, via a single printed vehicle. However these patents make no reference to the elements and/or processes for combining a wide range of sponsored element types, onto a poster, with a companion website and/or virtual presence or online presence and/or of being part of an electronic, interactive messaging system.

Further, as the current invention's business practice is to be cooperatively sponsored, Mitchell's U.S. Pat. No. 6,196,592 B1, Mar. 6, 2001, for Cooperative Promotions, and Disterdick's Patent Publication No. 2005/0049919 A1, Mar. 3, 2005 for a Method for Advertising and Patent Publication No. 2006/0173745 A1, Aug. 3, 2006 for a Tiered Method of Advertising both.

Allison's Patent No. 2008/0217905A, Sep. 11, 2008 for an Advertising Program Using Playing Cards provides a description of a method for marketers to cooperate in a print based cardboard medium. Allison's scope is however limited to card decks, and has a very casino-oriented focus. Further, Allison makes no mention of utilizing a poster or elements related to the current invention's poster component.

Interactive Advertising Patents

As the current invention also concerns methods of interactive advertising Strunk's U.S. Pat. No. 6,708,176 B2, Mar. 16, 2004 for a System & Method for Interactive Advertising System refers to a method for delivering public ads and announcements in an interactive format, but the patent relates to an electronic system with no mention or reference to the use or utilization of physical paper-based print publication as a component of the interactive elements.

Villanueva's Patent Publication No. 2008/0126152 A, May 29, 2008 for an Internet Based Advertising & Marketing Management Interactive System, includes language involving "a plurality of adjacent boxes composing as a whole an advertising collage, and that these boxes can be grouped selectively, in multiple combinations with flexible edges", which has some relation to the current invention's methods of image display. However, the patent begins with a "first website", and relates purely to electronic media. No reference or mention is made in Villanueva's patent of there being a paper, or other such materials poster, capable of delivering multiple promotions and or samples on the physical body of the invention. Further, there is no mention of having the sponsors being a component part of combination promotion.

Objects & Advantages of the Invention

A principal object of the present invention is to create a new commercial marketing communications vehicle.

Another object of the present invention is realize a new, creatively expressive commercial pop art form.

Another object of the present invention is to have a way to easily fund a form of new pop art.

Another object of the present invention is to provide a communications method that delivers multiple types of marketing messages and techniques in a single, integrated, interactive form.

Another object and advantage of the present invention is to create a sponsorable large format, multi-media poster-based publication.

Another object and advantage of the present invention is to create a unique and novel showcase for new print and electronic technology.

Another object of the present invention is to assist advertisers to gain the benefits and advantages of improved brand imaging through association with other advertisers.

The Applicant is unaware of inventions or patents, taken either singly or in combination, which are seen to describe the instant invention as claimed.

SUMMARY OF THE INVENTION

The present invention relates to collage-based, integrated advertising systems and methods of advertising.

A collage-based, integrated advertising system includes a physical component and an information-providing component. Preferably, a user is directed to the information-providing component by the physical component. The collage-based, integrated advertising system may further include an information gathering component.

The physical component displays a collage comprised of multiple advertising items from at least one advertiser or sponsor. The information-providing component provides additional information related to at least one of the advertising items and at least one advertiser for a user to at least view.

In a first embodiment, the physical component is a printed publication.

In a second embodiment, the physical component of the collage-based, integrated advertising system is a support structure. Preferably, the collage-based, integrated advertising system may further include all of the additional or other specifics and/or entities described above in the first embodiment.

In a third embodiment, the present invention is directed to a method of advertising using a collage-based, integrated advertising system.

The method of advertising includes the steps of:
providing a physical component, wherein the physical component displays a collage comprised of a plurality of advertising items from at least one advertiser; and
providing an information-providing component, wherein the information-providing component provides additional information related to at least one of the advertising items and the at least one advertiser for a user to at least view.

Preferably, a user is directed to the information-providing component by the physical component:

The physical component of the third embodiment is a printed publication, such as those described above in the first embodiment.

Preferably, the method of advertising of this third embodiment may further include the step of providing an information gathering component. Preferably, the method of advertising of this third embodiment may further include all of the additional or other specifics and/or entities described above in the first embodiment.

In a fourth embodiment, the present invention is also directed to a method of advertising using a collage-based, integrated advertising system.

The physical component of the fourth embodiment is a support structure, such as those described above in the first embodiment.

Preferably, the method of advertising of this fourth embodiment may further include the step of providing an information gathering component. Preferably, the method of advertising of this fourth embodiment may further include all of the additional or other specifics and/or entities described above in the first embodiment.

Figure 1:
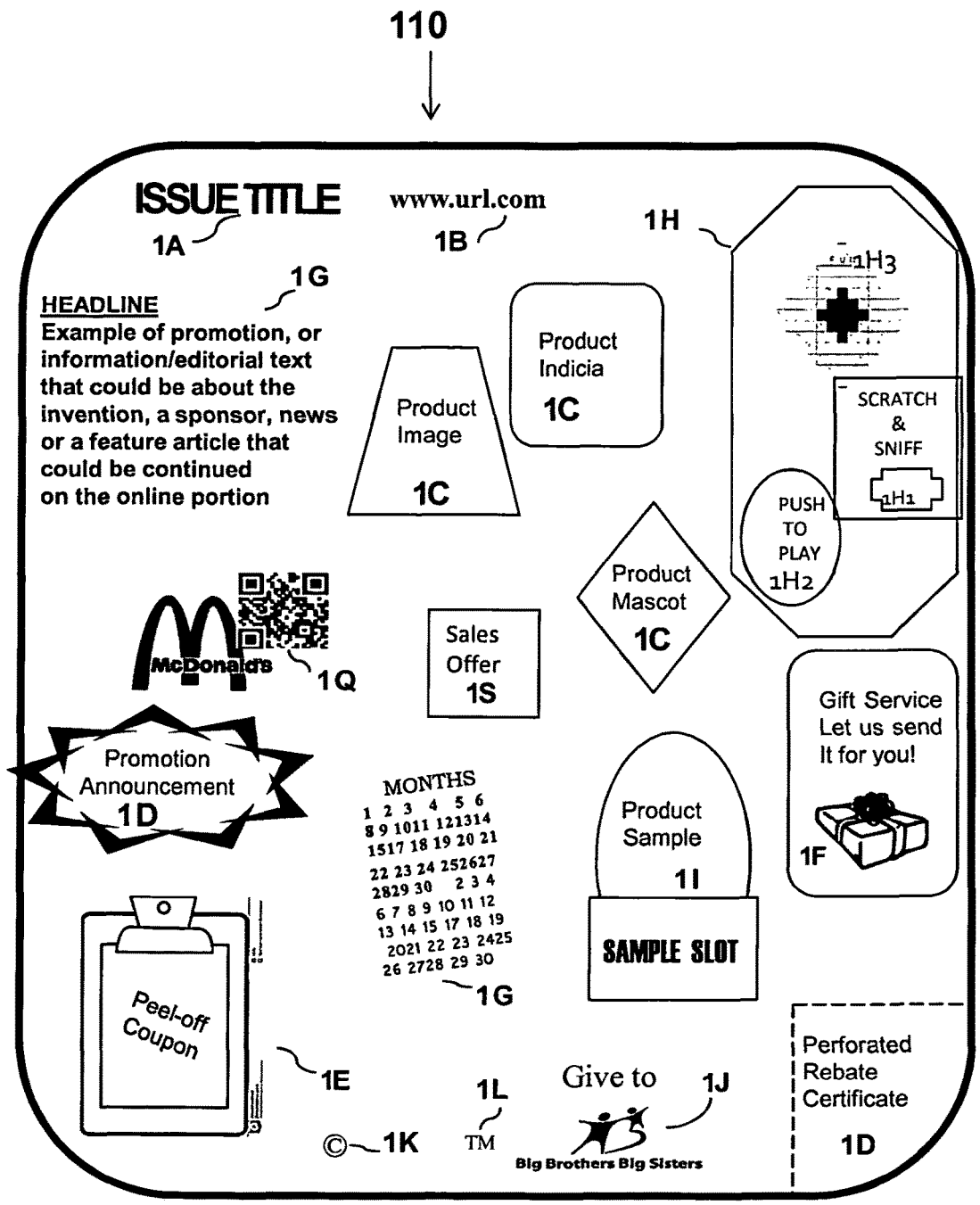
FIG. 1 is an exemplary embodiment of a physical component of a collage-based, integrated advertising system according to the present invention.

It should be understood that the above-attached figures are not intended to limit the scope of the present invention in any way.

DETAILED DESCRIPTION OF THE PREFERRED EMBODIMENTS

The present invention relates to collage-based, integrated advertising systems 100 and methods of advertising.

Referring to FIGS. 1-15, the collage-based, integrated advertising system 100 includes a physical component 110 and an information-providing component 150. Preferably, a user U is directed to the information-providing component 150 by the physical component 110. The collage-based, integrated advertising system 100 may further include an information gathering component C, 12B, 12C.

Referring to FIGS. 1 and 3-8, the physical component 110 displays a collage 112 comprised of multiple advertising items 114 from at least one advertiser or sponsor.

Referring to FIGS. 2, 3 and 9-12, the information-providing component 150 provides additional information 152 related to at least one of the advertising items 114 and at least one advertiser for a user to at least view.

In a first embodiment and referring to FIGS. 1 and 3-8, the physical component 110 is a printed publication 110. Preferably and as a non-limiting example, the physical component 110 may be navigable via a sensory recognition entity, a sensory input entity, or an activity guiding entity.

Preferably and as a non-limiting example, the printed publication 110 is a poster. Alternatively and as other non-limiting examples, the printed publication 110 may be a brochure, a component of a magazine, a component of a newspaper, and any combination thereof.

Figure 3:
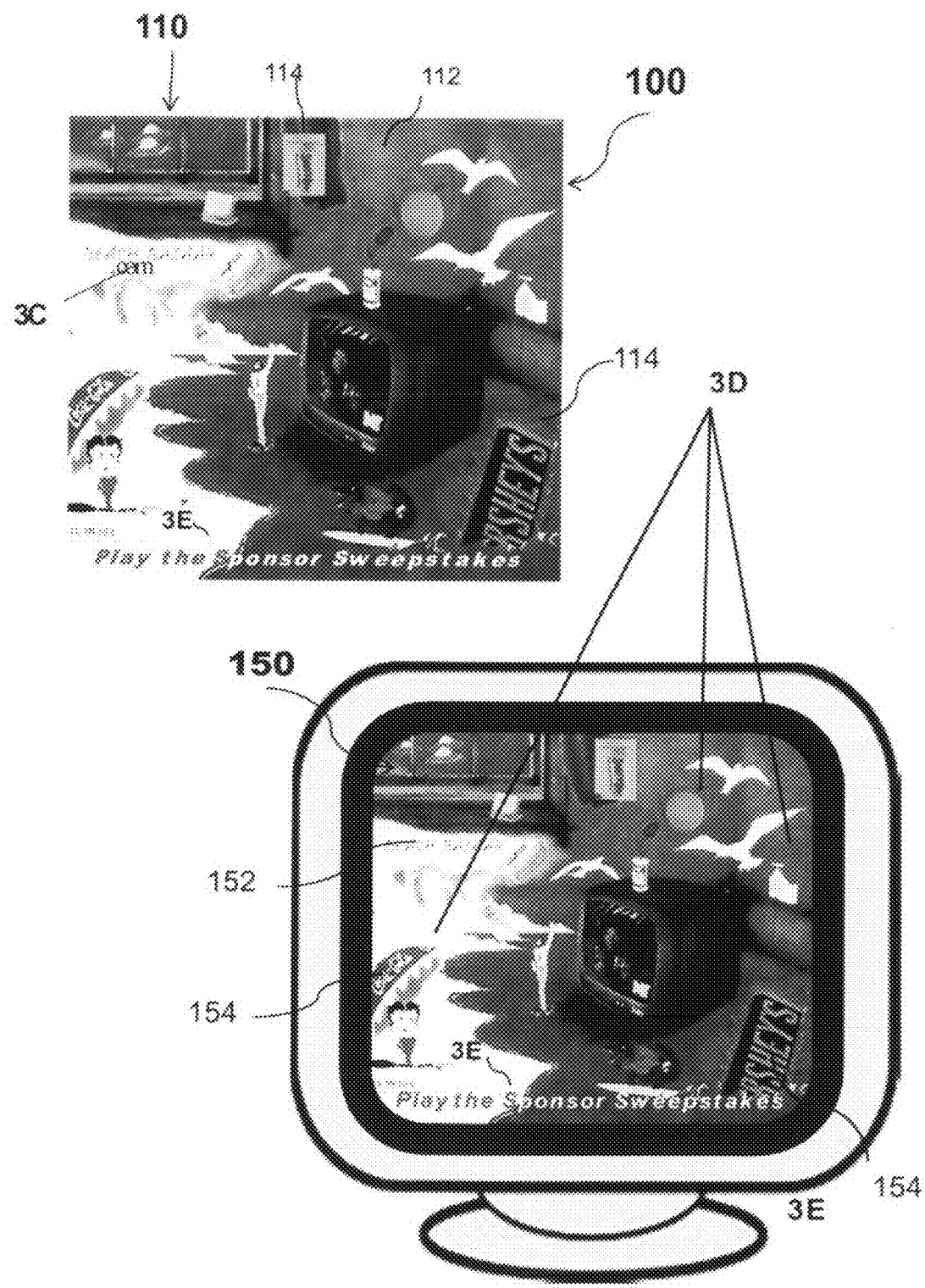
FIG. 3 is an exemplary example of a blended, unified, scenic image Beach Bazaar themed embodiment of a collage-based, integrated advertising system according to the present invention, including a physical component in the form of a print poster and a substantially similar information-providing component.

As a non-limiting example and as shown in FIGS. 3-8, the collage 112 displayed by the physical component 110 is comprised of multiple advertising items 114 that are integrated and blended together to create a unified, scenic pictorial collage 112. Also, the collage 112 may have a central theme that is directed to a particular target audience or group, such as, but not limited to, students from a university, a college, a graduate school, a senior high school, a junior high school, a vocational school, or a trade school, or to random viewers and potential customers. As non-limiting examples, some themes are related to beach bazaar, such as shown in FIG. 3. Alternatively, the collage 112 does not have a central theme.

As non-limiting examples, the multiple advertising items 114 may be a Uniform Resource Locator (URL), a # tag, a product image, a product depiction, a product picture, a product symbol, a product graphic, a branding iconography, a number, a 3-dimensional (3-D) image, a slogan, a motto, a description, a title, a headline, an editorial copy, a commentary, a publicity message, a public service announcement, a song or portion thereof, a jingle, a tagline, a poem, a limerick, an axiom, a mascot, a characterization, an audio tone, an animation, a video, a scent, a game, a puzzle, a riddle, a coded item, a quick response code, a snap code, a meme, a paper thumb drive, an artificial reality message, a near field communication message, a tweet, a schedule, a calendar, a list, a coupon, a rebate, a free offer, a discount offer, a sales offer, a trading offer, a list of products, a list of features, a sweepstakes, a contest, a sample, a sales promotion technique, a trademark, a service mark, a legal notice, a warranty, a guarantee, and any combination thereof.

As non-limiting examples, the multiple advertising items 114 may be presented in a form, such as actual, realistic, altered, adapted, abstracted, interpreted, and any combination thereof.

As non-limiting examples, the multiple advertising items 114 may be expressed through a text, a statement, an image, a graphic, a photo, a sign, a symbol, iconography, a sound, a smell, a texture, a flavor, a research-related element, a motion picture, an engagement device, an activity, a specialty production technique, and any combination thereof.

As stated above, the information-providing component 150 provides additional information 9C related to at least one of the advertising items 114 and the at least one advertiser for a user to at least view.

Preferably and as a non-limiting example, the information-providing component 150 is an electronically displayable software related entity. More preferably, the information-providing component 150 may be electronically displayable as a website home page, a website content page, a mobile website home page, a mobile website content page, an interactive signage, a projectable image, or any combination thereof.

Preferably and as a non-limiting example, the information-providing component 150 is an interactive information-providing component, and whereby the user interacts with the interactive, information-providing component to at least view the additional information 9C.

Preferably and as a non-limiting example, the information-providing component 150 displays a collage 152 comprised of a plurality of advertising items 154 from the at least one advertiser or sponsor. More preferably, the collage 152 displayed by the information-providing component 150 is substantially similar to the collage 112 displayed by the physical component 110.

Preferably and as a non-limiting example, the information-providing component 150 may be navigable via a sensory recognition entity, a sensory input entity, or an activity guiding entity.

Figure 12:
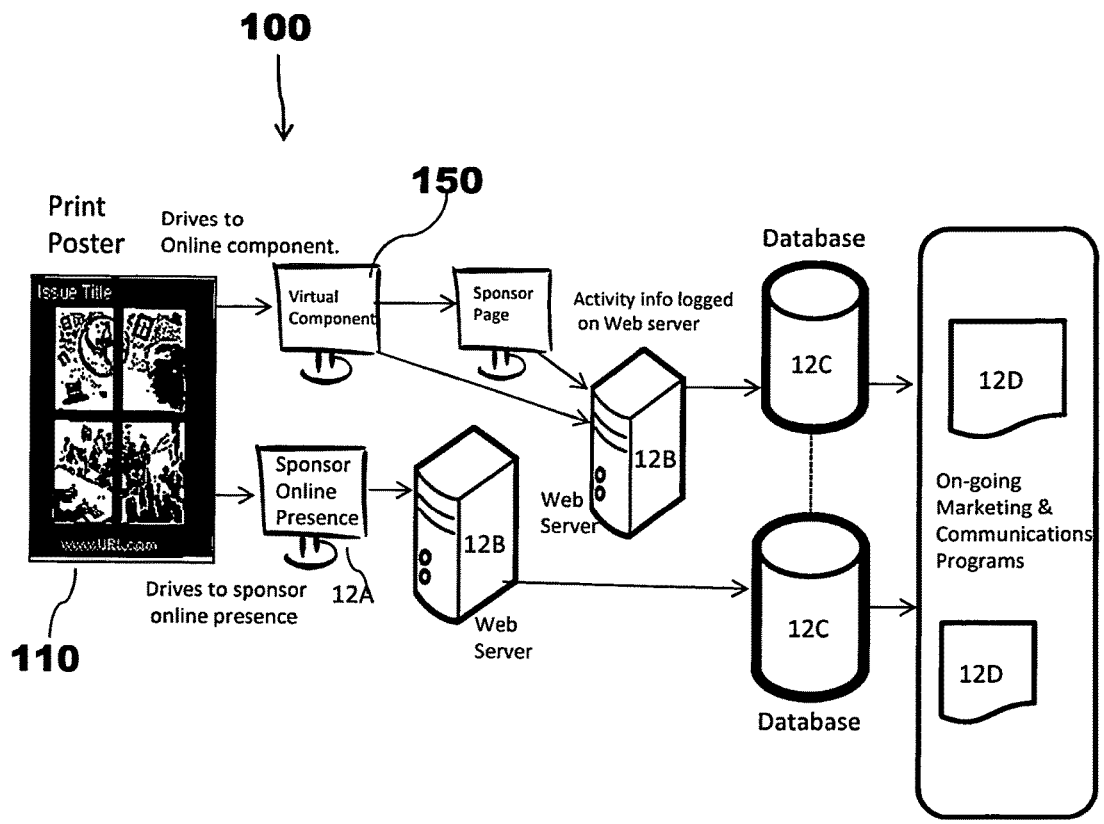
FIG. 12 depicts the elements and method of gathering, storing and using interaction information by a collage-based, integrated advertising system according to the present invention.

Referring to FIG. 12, the information gathering component C, 12B, 12C gathers interaction information related to interactions of the user and gathers operational components information of at least one of the physical component 110 and the information-providing component 150. Preferably and as a non-limiting example, at least one of the interaction information and the operational components information is used for communicating at least one follow-up communication with the user.

In a second embodiment, the physical component 110 of the collage-based, integrated advertising system 100 is a support structure. Preferably, the collage-based, integrated advertising system 100 may further include all of the additional or other specifics and/or entities described above in the first embodiment.

As non-limiting examples, the support structure may be a billboard, an advertising structure at a banking center, a support structure at a banking center, an advertising structure at a transportation center, a support structure at a transportation center, an advertising structure at an education center, a support structure at an education center, an advertising structure at an arts center, a support structure at an arts center, an advertising structure at a sports venue, a support structure at a sports venue, an advertising structure at an entertainment center, a support structure at an entertainment center, an advertising structure at a dining establishment, a support structure at a dining establishment, an advertising structure at a mercantile venue, a support structure at a mercantile venue, an advertising structure at a trading venue, a support structure at a trading venue, an advertising structure at a retailing venue, a support structure at a retailing venue, an advertising structure at a corporate venue, a support structure at a corporate venue, an advertising structure at a special event, a support structure at a special event, an advertising structure at a public venue, a support structure at a public venue, and any combination thereof.

In a third embodiment, the present invention is directed to a method of advertising using a collage-based, integrated advertising system 100.

The method of advertising includes the steps of:
providing a physical component 110, wherein the physical component 110 displays a collage 112 comprised of a plurality of advertising items 114 from at least one advertiser; and
providing an information-providing component 150, wherein the information-providing component 150 provides additional information 9C related to at least one of the advertising items 154 and the at least one advertiser for a user to at least view.

Preferably, a user is directed to the information-providing component 150 by the physical component 110.

The physical component 110 of the third embodiment is a printed publication, such as those described above in the first embodiment.

Preferably, the method of advertising of this third embodiment may further include the step of providing an information gathering component C, 12B, 12C. Preferably, the method of advertising of this third embodiment may further include all of the additional or other specifics and/or entities described above in the first embodiment.

In a fourth embodiment, the present invention is also directed to a method of advertising using a collage-based, integrated advertising system 100.

The physical component 110 of the fourth embodiment is a support structure, such as those described above in the second embodiment.

Preferably, the method of advertising of this fourth embodiment may further include the step of providing an information gathering component C, 12B, 12C. Preferably, the method of advertising of this fourth embodiment may further include all of the additional or other specifics and/or entities described above in the second embodiment.

In another preferred embodiment, the physical component 110 of the collage-based, integrated advertising system 110 is a two-sided sheet. One side is printed with the collaged advertising items 114, with the other (reverse) side of the sheet, containing editorial matter. The physical component 110 of this embodiment of the invention achieves and operates as a new form of collage advertising based posterzine publication.

In another preferred embodiment, the physical component 110 of the invention is a two-sided sheet. One side is printed with the collaged advertising items 114, with the other (reverse) side of the sheet, containing editorial matter. When the physical component of the invention is combined with the information providing component, the combined embodiment of the invention operates as a new form of collage imaged-based multimedia (print and electronic) posterzine publication.

In another preferred embodiment, specialty printing and finishing elements, processes and production techniques may take the physical or virtual form(s) of, but are not limited to, glow, metallic, and custom color mix inks, vinyl printing, varnish and laminate application, folding, embossing, engraving, perforations, dye cutting, punch outs, stapling, clipping, stitching, adhesive affixing, insertion affixing, attaching via insertion, folding, pop-ups, pull tabs, heat stamping, scratch and sniff device application, three-dimensional printing, holographic printing, and any combination thereof. These techniques can be applied to all of the invention, or any selected parts, sections or elements, of either the physical 110 or the information providing component 150, together or separately, or in any combination thereof.

In another preferred embodiment of the invention, as creative license allows and warrants, the advertising items may be of many and various types and natures. One sound (audio) example is a Staples "That's Easy" push to play button or computer chip. A solicitation example is a charity contribution envelope. A smell example is a perfume fragrance pull-to-open flap. A flavor example is delivery of a stick of gum sample. A texture example is delivery of a ribbed condom. Also possible are engagement devices like an advertiser-related cross word puzzle, or interactive activity, such as a perforated, tear-out foldable cardboard calendar cube. While offering only several examples, this description is in no way meant to limit the options that are possible with this invention.

In another preferred embodiment of the physical component 110 of the collage-based, integrated advertising system 100, entitled Code Collage Contest, (not exampled) a collection of coded items, including but not limited to, QR codes, bar codes, artificial reality codes, and near field communications devices, are presented on a poster, and users are challenged to read, and/or decipher all the codes in order to be entered into the contest.

Another preferred embodiment the information providing component 150 of the collage-based integrated advertising system 150 is a software related entity, which will often be electronically displayed, wholly and/or in the component parts of, but not limited to, a website Home page, a website content page, a mobile website home page, a mobile website content page, as interactive signage, or a projectable image, and any combination thereof. The devices on which the mobile home page and content pages might appear, include but are not limited to, a phone, a tablet, a laptop computer and a notebook computer, an electronic billboard, an electronic wall board, and a projectable image, which can appear on essentially any light receiving surface, and any combination thereof.

In another preferred embodiment of a unified scenic pictorial version of the invention, the Beach Bazaar graphical treatment embodiment FIG. 3, demonstrates how advertising items 114, in adapted and interpreted forms, are blended into a combination custom collage 112 expressed scenic. The Coca Cola logo is appended to a beach umbrella sheltering cartoon character Betty Boop, and the MTV logo is present on the floating television set. Product depictions include a Budweiser can vase, a Marlboro cigarette box electrical panel, and Hersey bar adrift in the sea. The Sweet & Low packet that adorns the back represents an actual product sample affixed to the body of the physical component 110 of the collage-based integrated advertising system 100. Product symbols include the Good Year blimp hovering off shore, floating Sunkist orange, and a Flock of Seagulls, which references the rock band. Also a product characterization in the form of the Izod alligator rides the waves on a surf board, as a depiction of Carlos Castaneda, the metaphysical book author walks on the water.

The collage-based, integrated advertising system 100 wherein said interaction information is gathered, recorded, organized, and stored, and wherein data retrieval, formatting, and analysis methods are employed through at least one technique selected from the group consisting of manual, mechanical, automated, electrical, electronic, computerized, networked, and any combination thereof.

In another preferred embodiment of the information providing component 150 of the collage-based, integrated advertising system 100, the navigational sensory recognition, input and activity guiding entities include, but are not limited to, a keyboard, a mouse, a touch pad, a mouse pad, a track ball, an audio sensor, a tone, a text box, a uniform resource locator, a # tag (Twitter hash tag), hypertext, screen menus, clickable icons, a motion tracking device, an image reader, a near field communications sensor, typed text, number sequencing, alphanumeric sequencing, printed elements, hand writing, a drawing, three-space location, signal transport wires, lines and wireless means, and any combination thereof.

In another preferred embodiment of the information gathering elements 170 of the collage-based integrated advertising system 100, FIG. 12 depicts an overview diagram of the elements and methods of gathering, storing and using interaction information by the collage-based integrated advertising system 100. The collage physical component 110 drives viewers to the information-providing (website) component, or an advertiser website, of the collage-based integrated advertising system 100 where the additional information 9C including, but not limited to, site visitation and usage, can be gathered through web serving equipment and software 12B, for storage, manipulation, formatting, sharing, and retrieval in databases 12C, to be used in the creation of additional audience communications 12D. The additional communications may be, a single instance, intermittent, or ongoing communications, that can take the forms of, but are not limited to, email, text messages, additional pages added to the information providing component of the invention, a virtual group activity, tweets, social media pages (as on Facebook, MySpace, etc.), picture messages, regular postal mail, telephone calling, a promotion, etc., and any combination thereof.

Definition Of Terms

The term "collage" pertains, refers and includes, a combining or assemblage of various elements, and/or materials, of diverse elements or fragments, in unlikely or unexpected juxtaposition.

The term "advertiser" encompasses, and is a proxy for, but is not limited to, marketer(s), sponsor(s), promoter(s), manufacturer(s), producer(s), publicist(s), and other terms relating to any communications messaging management person, company, organization, group or entity, wishing to gain exposure for goods or services through participation with, and/or payment to a publisher of, the invention. The term "advertiser" also includes a publisher/manufacturer of the invention, that employs any form of the "advertising items" for self-promotion, which can be done independently, or in combination with any other advertiser(s). An example of publisher self promotion would be, the publisher of an instance (issue, edition) of the invention publication, organizing a contest involving advertisers' advertising items to provide additional communications messaging exposure for those advertisers, which in turn provides additional communications messaging exposure for the publisher (as an advertiser), against the publisher's target audience—the other advertisers.

The term "advertising items" includes, is equivalent to, and is a proxy for, but not limited to content messaging, discount, offer-based, sales or barter efforts, methods and/or techniques that include "branding", "promotional", "publicity", "public affairs", "informational" and/or "transactional" marketing communications, or any combination thereof.

The term "information providing component" relates to an online, virtual, electronic and/or digital entity that provides additional information about the advertising items presented on the physical component of the invention. In one preferred embodiment of the invention, the information providing component is a website, delivered from an Internet server, having pages relating to the advertising items appearing on the physical component of the invention.

The term "poster" means a large, eye-catching decorative announcement, advertisement, printed bill or placard that is exhibited to promote a product, event, or idea.

The term "cooperative" means an agreement among parties to participate together.

The term "association marketing" means a method or technique of having one, or more advertisers, benefit from inclusion among, proximity to, and/or participation with, another, or other advertisers, for the purpose of gaining added recognition, additional exposure, improved perception, positive reflection, etc., for the advertiser, or its product(s), brand(s), positioning, service(s), etc.

Figure 2:
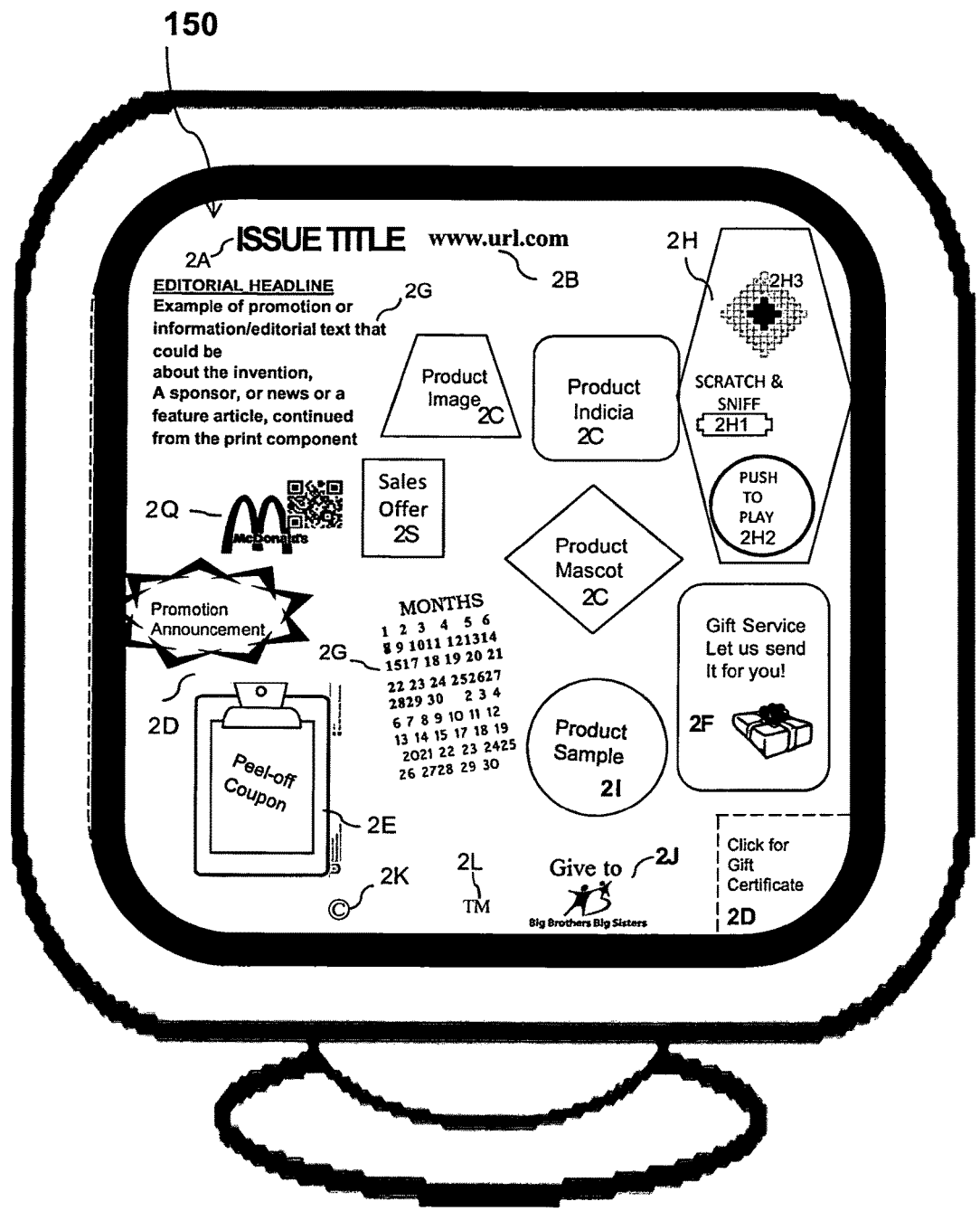
FIG. 2 is an exemplary embodiment of an information-providing component or virtual (Home Page) component of a collage-based, integrated advertising system according to the present invention.

FIG. 1 is an exemplary embodiment of the physical component 110 of the collage-based, integrated advertising system 100 showing, but not limited to, elements including, a Title 1A, URL 1B that directs viewers to the substantially similar information-providing component 150 or virtual component 150 of the system 100 as exampled in FIG. 2, Product Image/mascot/Indicia 1C, Promotional Announcement or Certificate 1D, Coupons 1E, Gift Service 1F, Promotional, Editorial or Instructional Text 1G, Interactive Activities 1H (Scratch & Sniff activity 1H1, Push-to-Play device 1H2, Crossword 1H3) Product Sample/Area 1I, Charity Solicitation 1J, Copyright 1K, Trademark symbol 1L, QR Code 1Q, and Sales Offer 1S.

FIG. 2 shows an exemplary embodiment of the information-providing component 150 or virtual (Home Page) component 150 of the collage-based, integrated advertising system 100 which is substantially similar to the physical component 110 shown in FIG. 1 includes, but not limited to, clickable icons that include a Title 2A, URL 2B, Product Image/Indicia/mascot 2C, Promotional Announcement or Certificate 2D, Coupons 2E, Gift Service 2F, Promotional, Editorial or Instructional Text 2G, Activities 2H (scratch & sniff activity 2H1, push to play 2H2, crossword 2H3), Product Sample/Sample Area 2I, Charity Solicitation 2J, Copyright 2K, Trademark symbol 2L, QR Code 2Q, and Sales Offer 2S. These icons are linked, but not restricted to advertiser information pages as demonstrated in FIG. 9.

FIG. 3 shows an exemplary example of a blended, unified, scenic image Beach Bazaar themed embodiment of the collage-based, integrated advertising system 100, including the physical component 100 in the form of a print poster 110 and substantially similar information-providing component 150 or virtual Home Page 150. The BeachBazaar.com URL 3C directs to the information-providing component 150 or virtual Home Page component 150. The click-to-navigate icons 3D are linked, but not limited, to sponsor information pages as demonstrated in FIG. 8. The "Play the Sponsor" promotional announcement 3E at the bottom of the image, links to a user a participation page or Contest Entry as embodied in FIG. 10.

Figure 4:
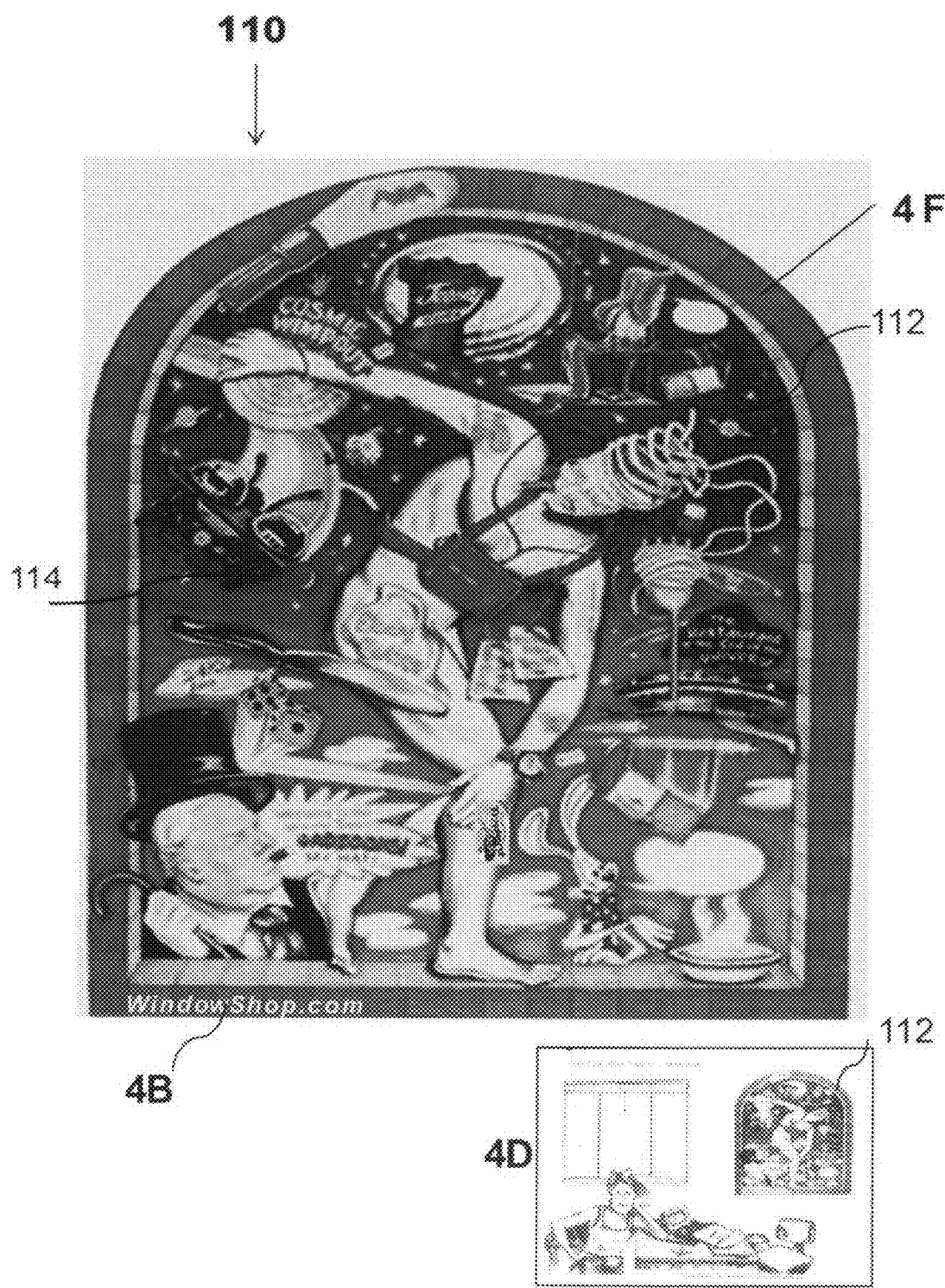
FIG. 4 is an exemplary example of a catalog-like Window Shop themed physical print poster component embodiment of a collage-based, integrated advertising system according to the present invention.
Figure 9:
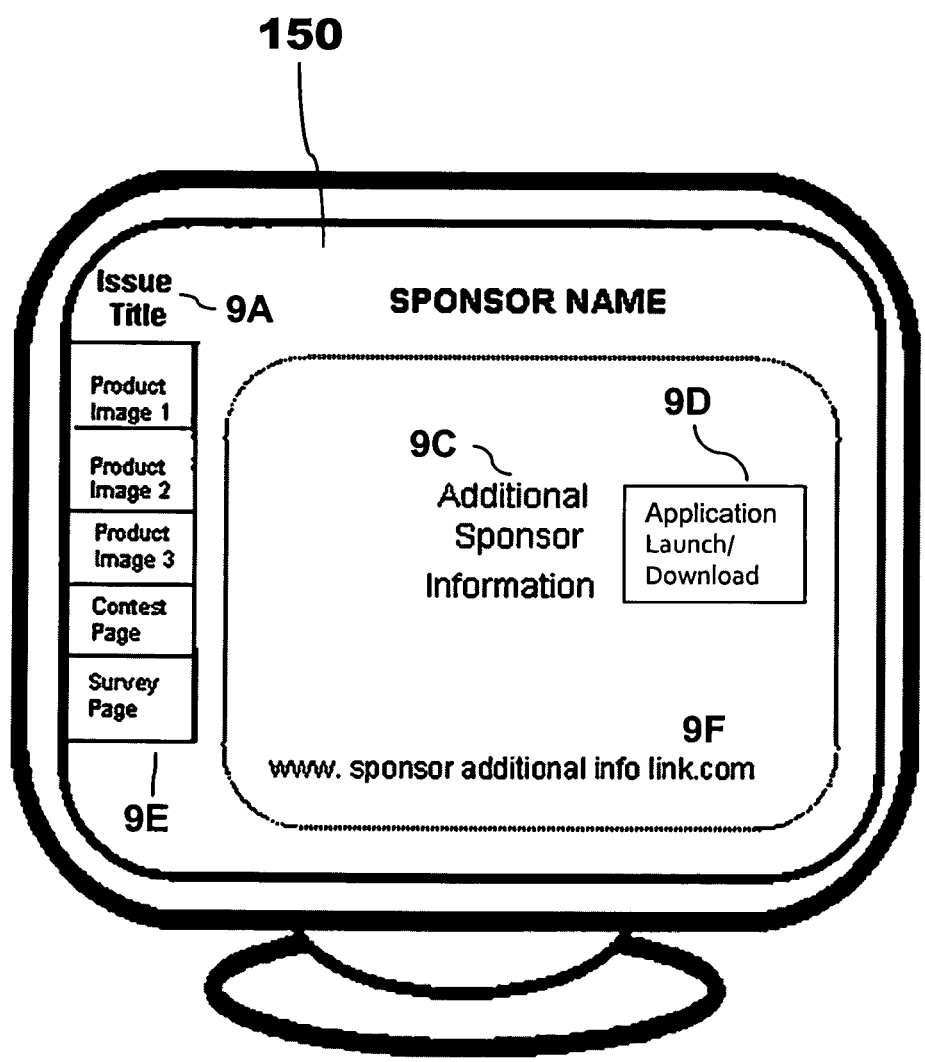
FIG. 9 is one exemplary embodiment of an Advertiser Information page of the information-providing component or virtual component of a collage-based, integrated advertising system according to the present invention.

FIG. 4 shows an exemplary example of a catalog-like Window Shop themed physical print poster component embodiment of the collage-based, integrated advertising system invention. The URL 4B directs to the information-providing component or virtual component of the invention as exampled in FIG. 2, where substantially similar virtual collaged advertiser icons are clickable, but not limited to, advertiser information pages as indicated in FIG. 9, and wherein the products may be offered, or linked for ecommerce sale.

The brick framing 4F around the Window Shop embodiment creates a novelty, kitsch architectural decoration, demonstrating how the invention advances the art of the collage form. The illustration at the bottom of the page 4D shows this embodiment of the invention is a college dorm room situation.

Figure 5:
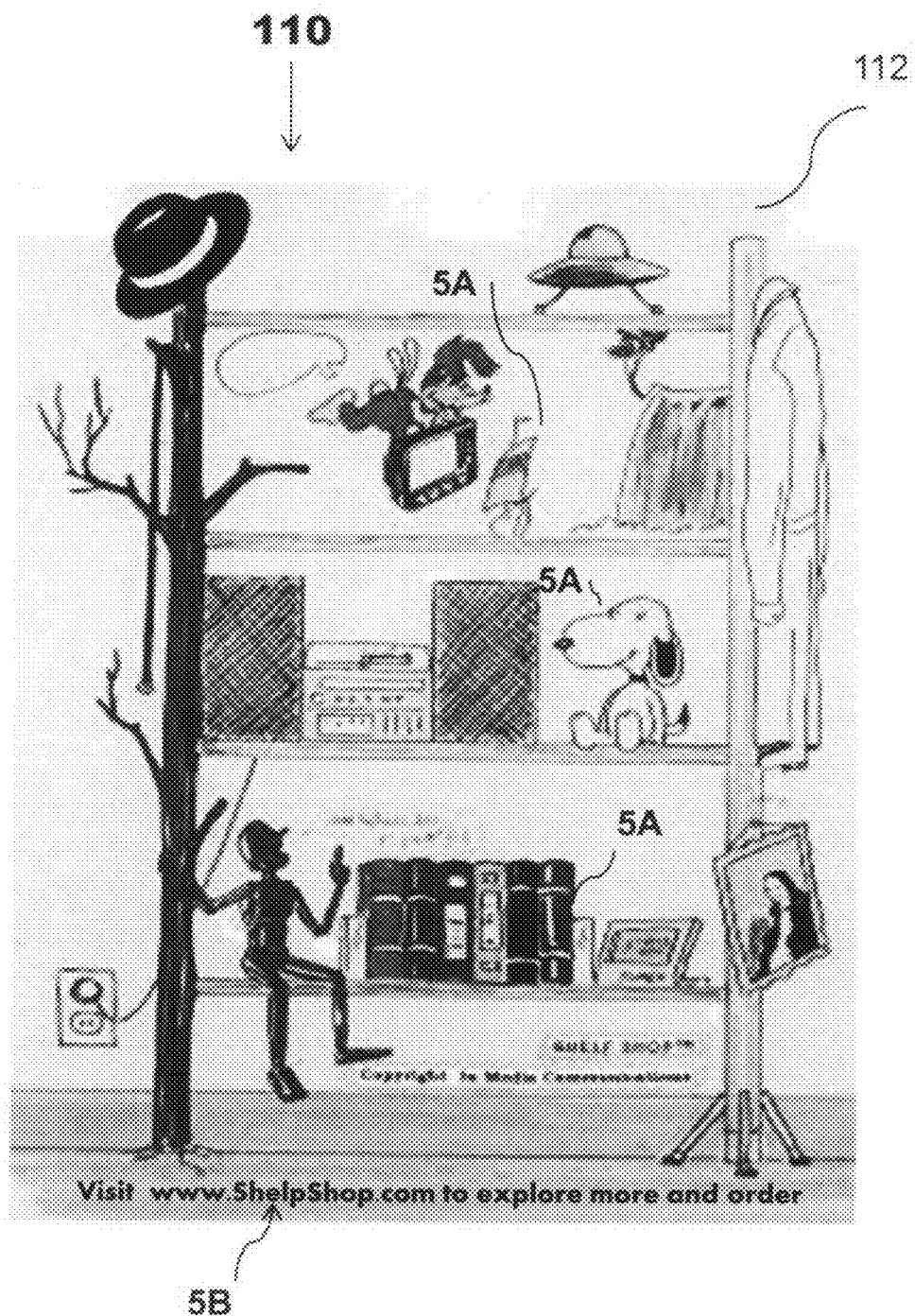
FIG. 5 is an exemplary example of the Shelf Shop-themed children's poster embodiment of the physical component of a collage-based, integrated advertising system according to the present invention.

FIG. 5 shows an exemplary example of the Shelf Shop-themed children's poster embodiment of the physical component of the collage-based, integrated advertising system invention, which portrays a group of children's products 5A. The Shelf Shop embodiment is intended to be printed on easy clean wipe-able vinyl which allows youngsters to draw or color on it with crayon or dry marker. The bottom located URL 5B directs to an information-providing component or virtual component of the invention as exampled in FIG. 2, where substantially similar, collaged advertiser indicia are clickable programmed icons leading, but not limited to, advertiser information pages as indicated in FIG. 9, and wherein the products may be offered or linked for ecommerce sale. This vinyl printed, shelf graphic motif embodiment demonstrates an interactive element of the physical component of the invention, providing further evidence of how the current invention advances the nature and function of the collage art form.

Figure 6:
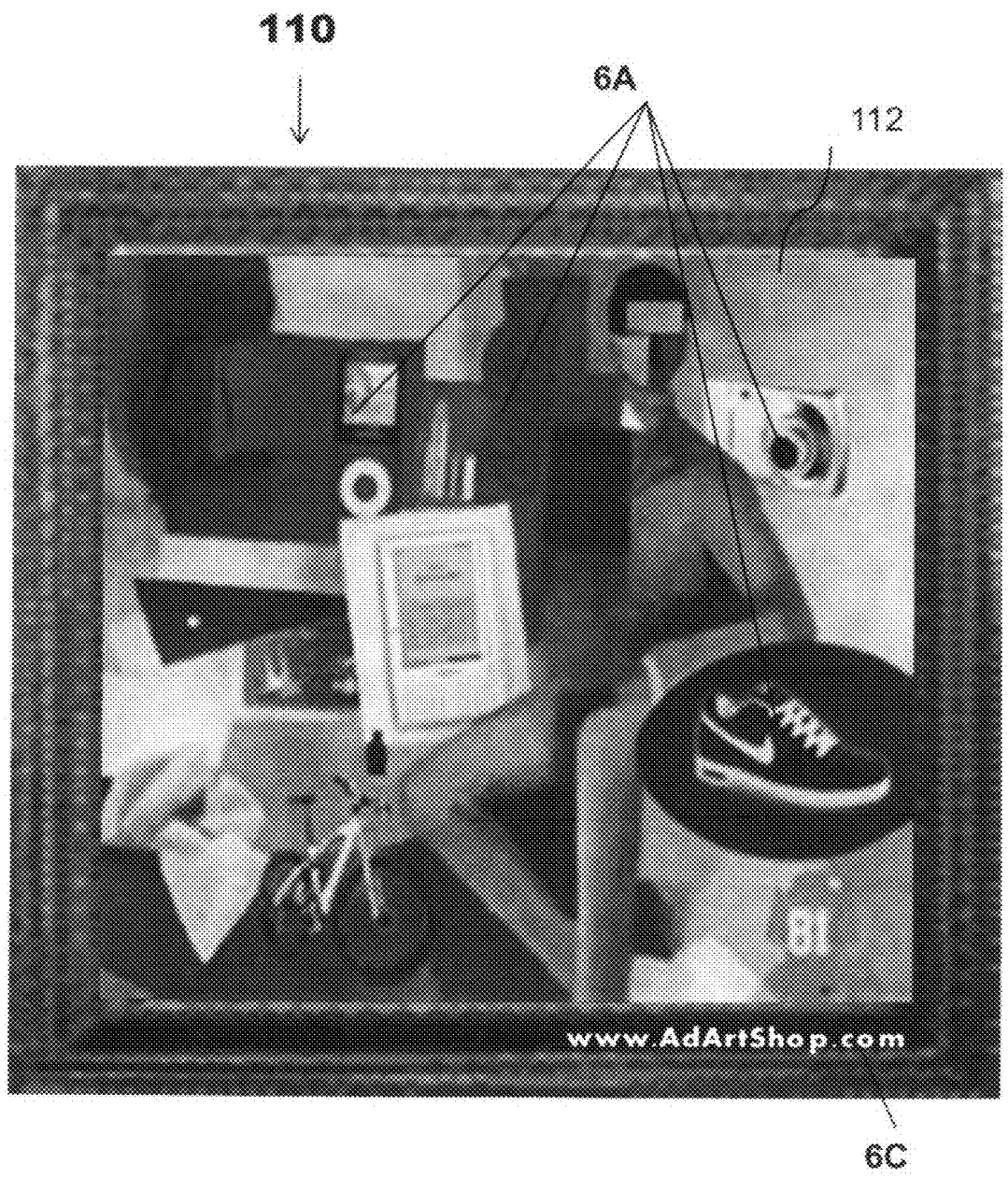
FIG. 6 is an exemplary example of the AdArt embodiment of the physical component of a collage-based, integrated advertising system according to the present invention.

FIG. 6 shows an exemplary example of the AdArt embodiment of the physical component of the collage-based, integrated advertising system invention, which adds advertiser/product indicia 6A to existing masterpiece paintings, in this case Roger de la Fresnaye's Man Sitting. The URL at the bottom corner 6C directs to an information-providing component or virtual component of the invention, as exampled in FIG. 2, where the substantially similar, collaged advertiser indicia are clickable programmed icons leading to advertiser information pages as indicated in FIG. 9, and wherein the products may be offered or linked for ecommerce sale.

Figure 7:
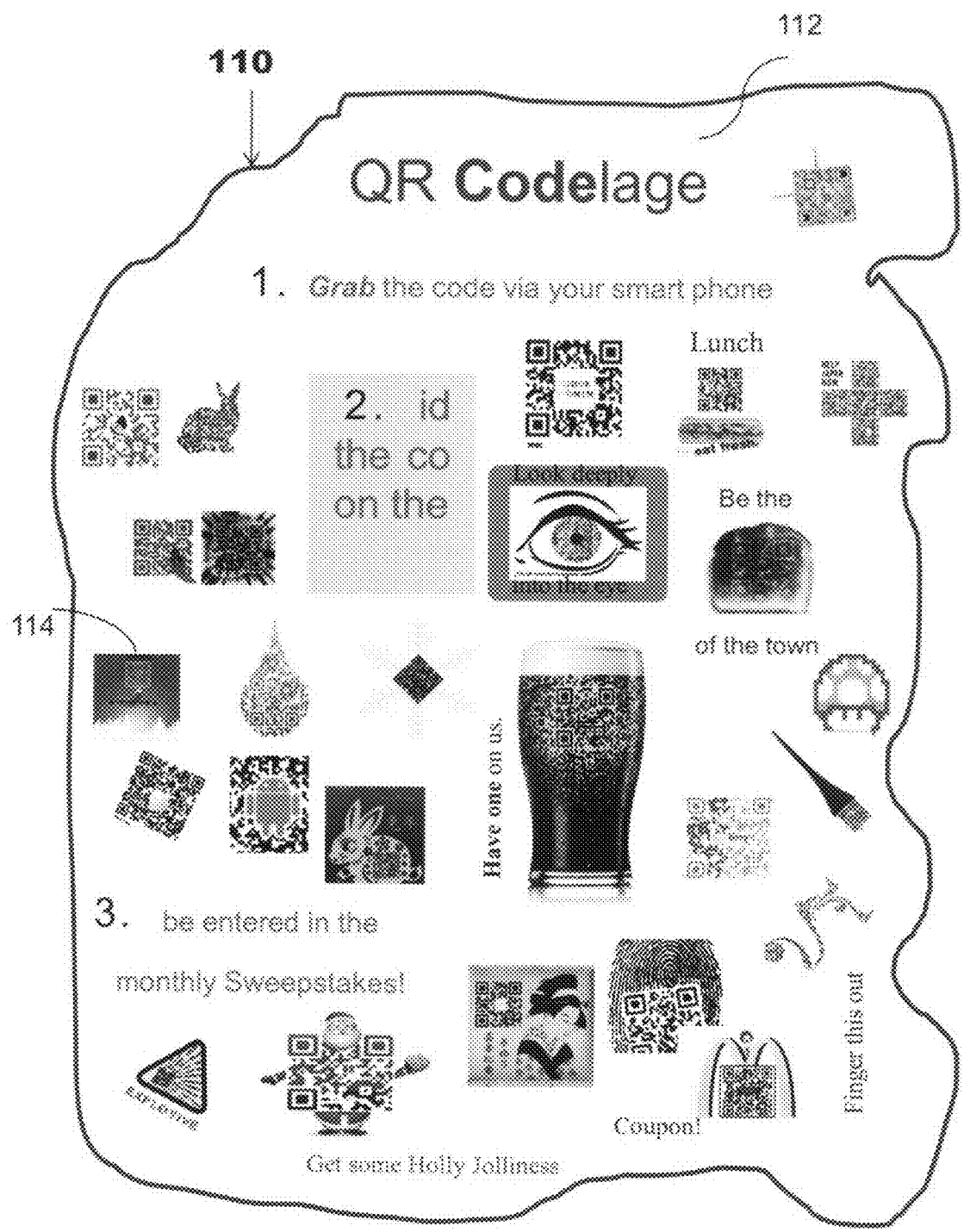
FIG. 7 is an exemplary example of the QR Codelage die cut outline embodiment of the physical component of a collage-based, integrated advertising system according to the present invention.

FIG. 7 shows an exemplary example of the QR Codelage die cut outline embodiment of the physical component of the collage-based, integrated advertising system invention, where a variety of Quick Response codes are displayed for smart phone reading and the receiving of information about, but not limited to, advertiser information. In this embodiment, an information gathering form, would also be delivered, allowing the user to entered into a sweepstakes promotion, as indicated by the 1., 2., 3. messaging contained on the body of the collage 112. This embodiment demonstrates how the collage medium can be used in conjunction with advanced technology to effect a fun, interesting way to deliver marketing related activities, which demonstrates an advance in the nature and function of the collage medium.

Figure 8:
FIG. 8 is an exemplary embodiment of the Calendar Bazaar themed embodiment of the physical component of a collage-based, integrated advertising system according to the present invention.

FIG. 8 shows an exemplary embodiment of the Calendar Bazaar themed embodiment of the physical component of the collage-based, integrated advertising system invention, composed of monthly schedule of days 8A, incorporated among, within and upon product imagery and descriptions. This embodiment shows how useful information can be incorporated into a creative commercially oriented collage, further demonstrating an advancement of the collage medium.

FIG. 9 shows one exemplary embodiment of an Advertiser Information page of the information-providing component or virtual component of the collage-based, integrated advertising system, with a Title 9A Sponsor Name 9B, Additional information area 9C, Application entry or download 9D, navigation menu 9E, and link to additional sponsor information 9F. The formatting layout and components of the page may take many forms, and the current example is not intended to limit in any way the interpretation or possible development approaches of this embodiment.

Figure 10:
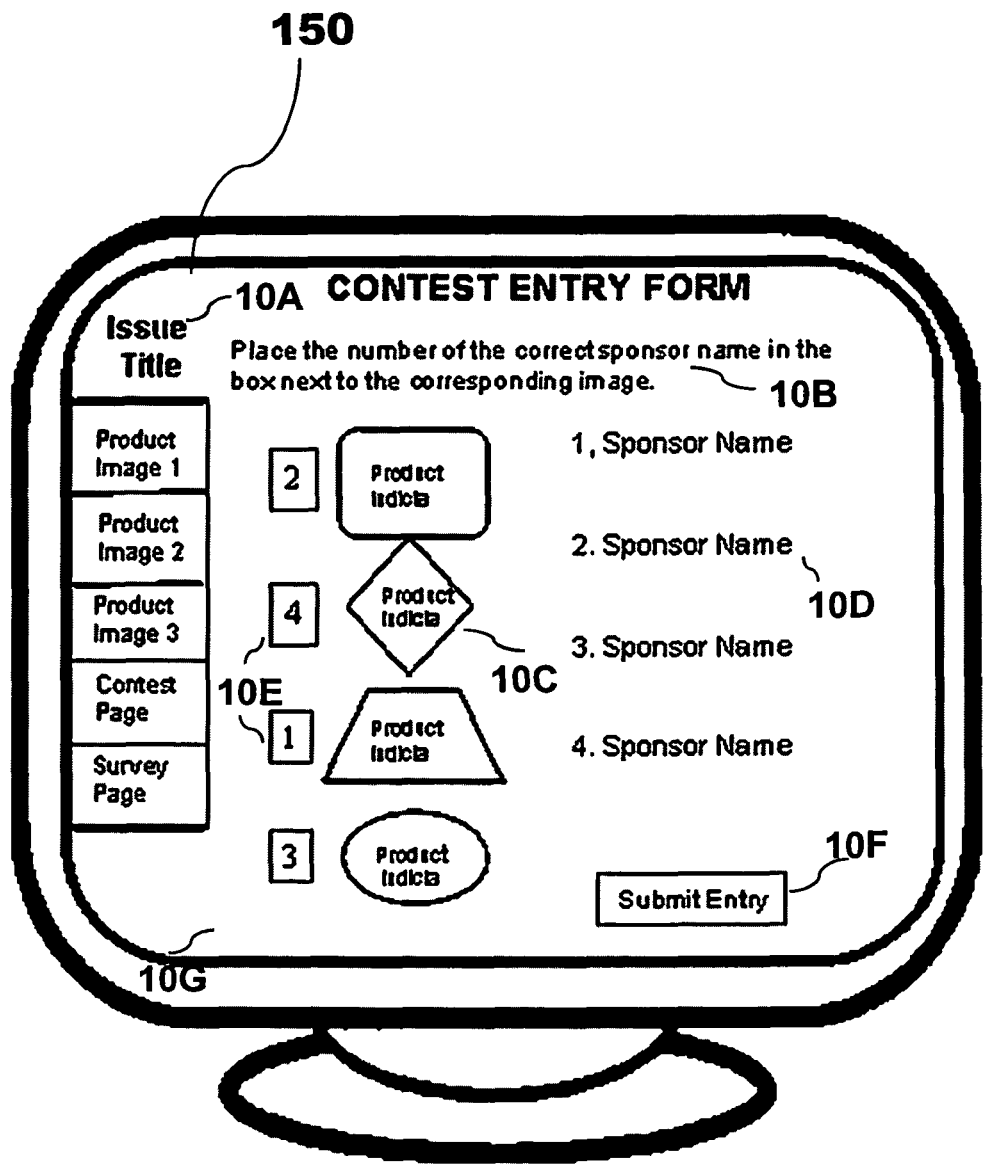
FIG. 10 is an exemplary example of a Promotion Participation Entry Page embodiment contained on the virtual website component of a collage-based, integrated advertising system according to the present invention.

FIG. 10 shows an exemplary example of a Promotion Participation Entry Page embodiment contained on the virtual website component of the collage-based, integrated advertising system invention, which demonstrates how sponsor indicia (which also appear on the physical component and the information-providing component or virtual component) can be part of and/or deliver a promotional activity, The page contains a Title 10A, participation instructions 10B, product indicia 10C, and sponsor names 10D, to be matched by entering the number of the sponsor name in the box next to the indicia 10E. Page navigation is also portrayed 10G. A submit entry button 10F is also portrayed. Additional components of this embodiment (not shown) are a form for providing personal information so that winners can be notified, and Official Rules (not shown) page may also be present on the virtual component of the invention.

Figure 11:
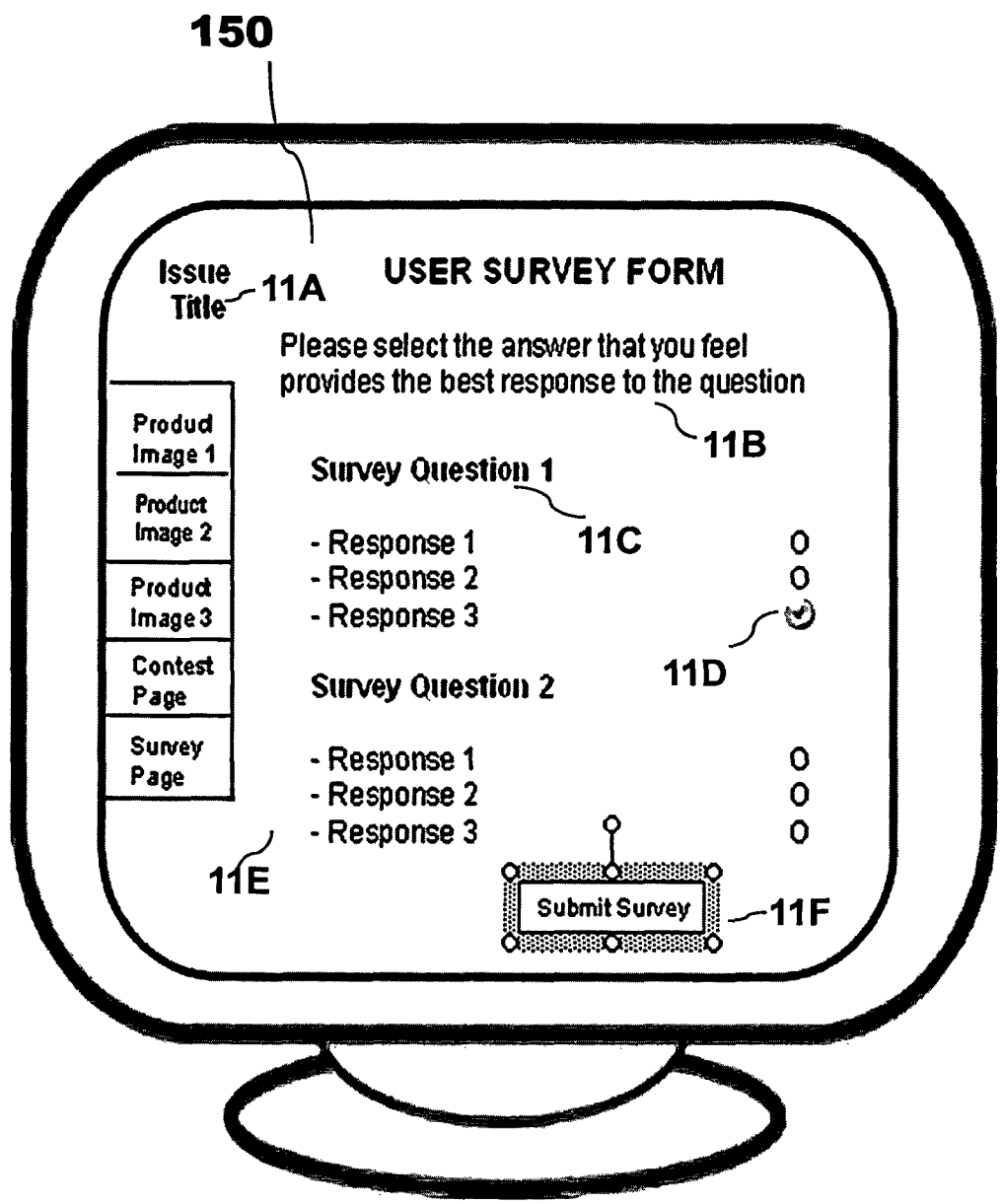
FIG. 11 is an example of a User Survey page embodiment of the information-providing component or virtual component of a collage-based, integrated advertising system according to the present invention.

FIG. 11 shows an example of a User Survey page embodiment of the information-providing component or virtual component of the collage-based, integrated advertising system, containing a Title 11A, participation instructions 11B, Survey Questions 11C, Survey Response buttons 11D, Page Navigation 11E and a Submission Form button 11F.

FIG. 12 depicts the elements and method of gathering, storing and using interaction information by the collage-based, integrated advertising system 100. The collage poster component 110 drives viewers to the information-providing component 150 or virtual (website) component 150 of the system 100 or an advertiser website 12A, where information including, but not limited to, site visitation and use can be gathered through web serving equipment and software 12B, for storage, manipulation, formatting, sharing, and retrieval in databases 12C, to be used in the creation of audience communications 12D.

Figure 13:
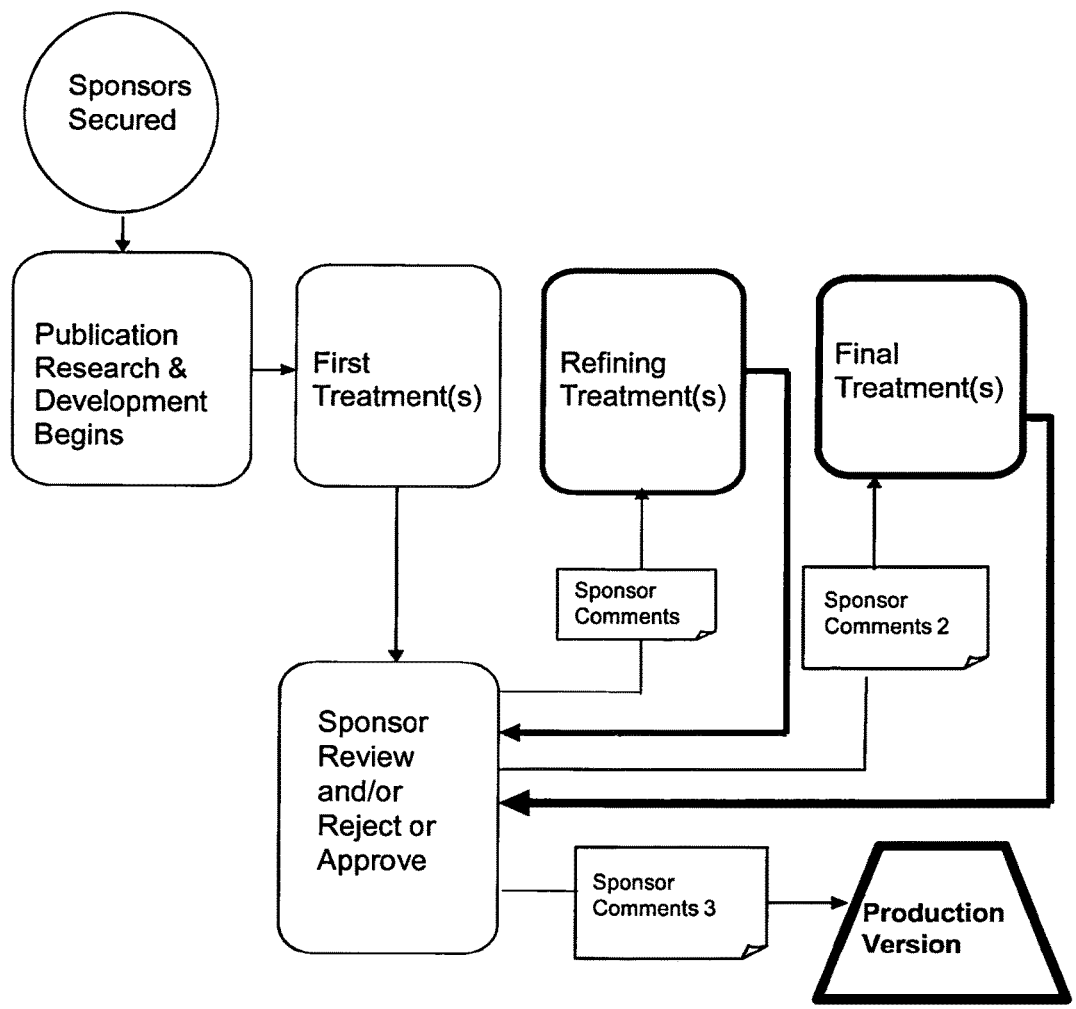
FIG. 13 is a diagram provides an exemplary example of a collage-based, integrated advertising system according to the present invention's concept development process which depicts, but is not limited to, a series of creative development and revision rounds until agreement on an final creative execution is reached.

FIG. 13 shows a diagram provides an exemplary example of the collage-based, integrated advertising system invention's concept development process which depicts, but is not limited to, a series of creative development and revision rounds until agreement on an final creative execution is reached.

Figure 14:
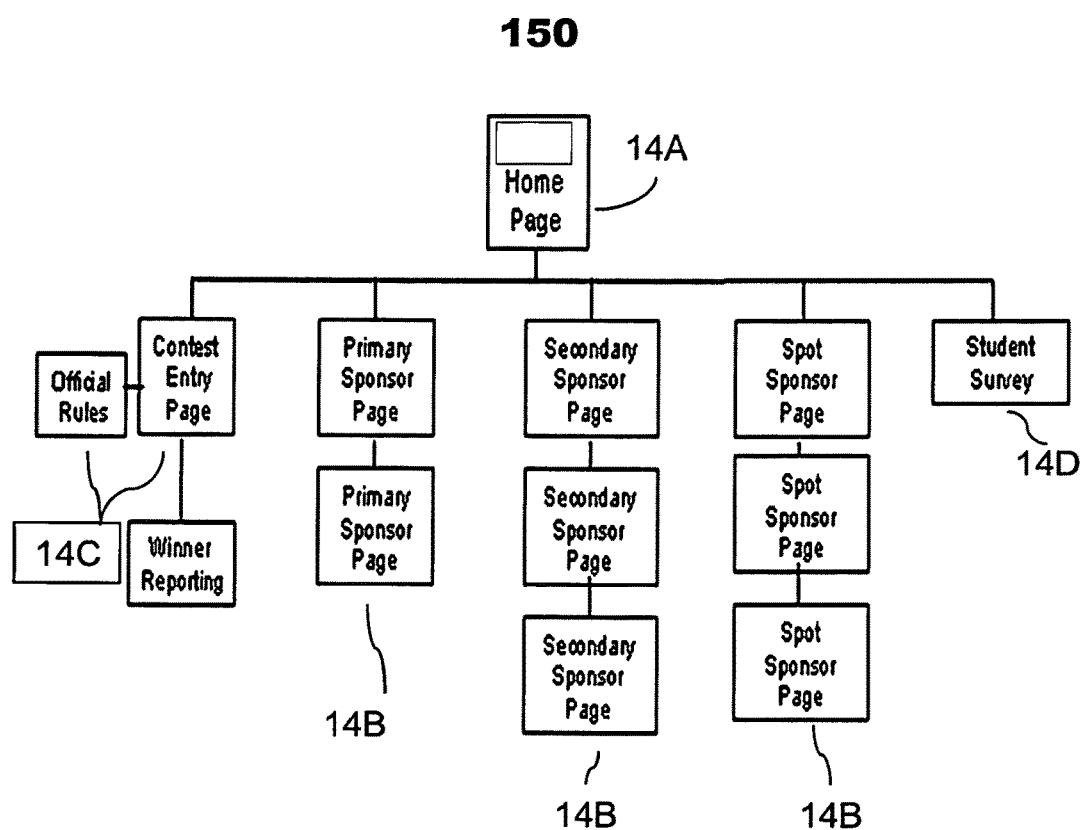
FIG. 14 is an exemplary example of a collage-based, integrated advertising system according to the present invention's virtual component website embodiment with Home page, Sponsor information pages, Promotion pages and Survey pages.

FIG. 14 shows an exemplary example of the collage-based, integrated advertising system invention's virtual component website embodiment with Home page 14A, Sponsor information pages 14B, Promotion pages 14C and Survey pages 14D.

Figure 15:
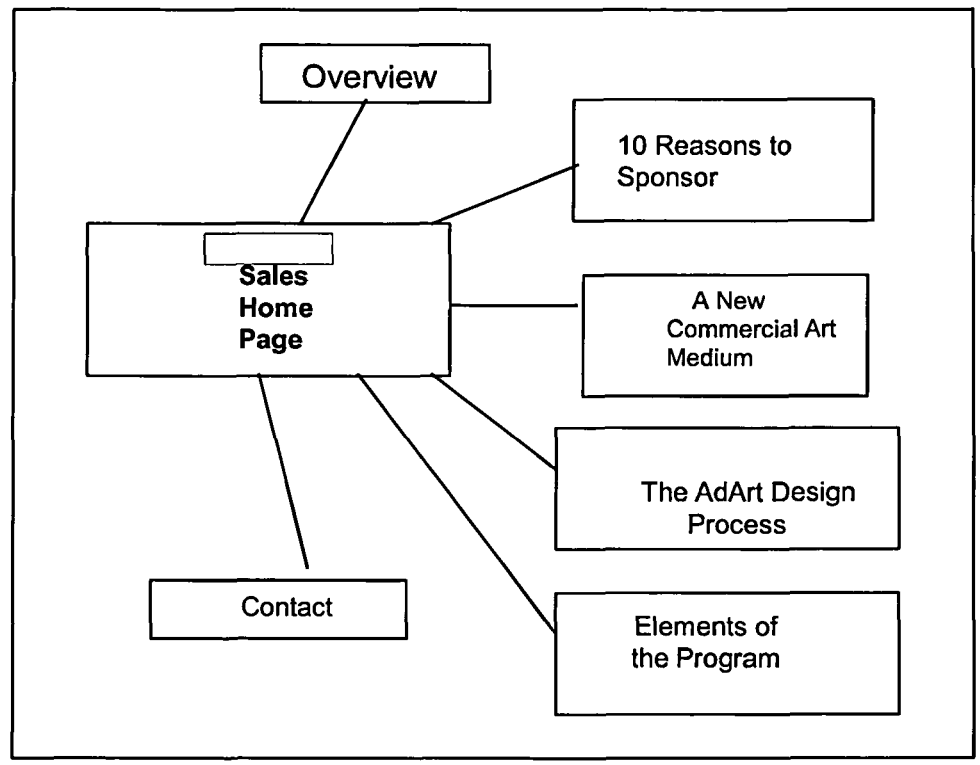
FIG. 15 is a diagram of the elements of a sales support website for a collage-based, integrated advertising system according to the present invention.

FIG. 15 shows a diagram of the elements of the Sales support website for a collage-based, integrated advertising system 100 of the present invention.

Figure 16:
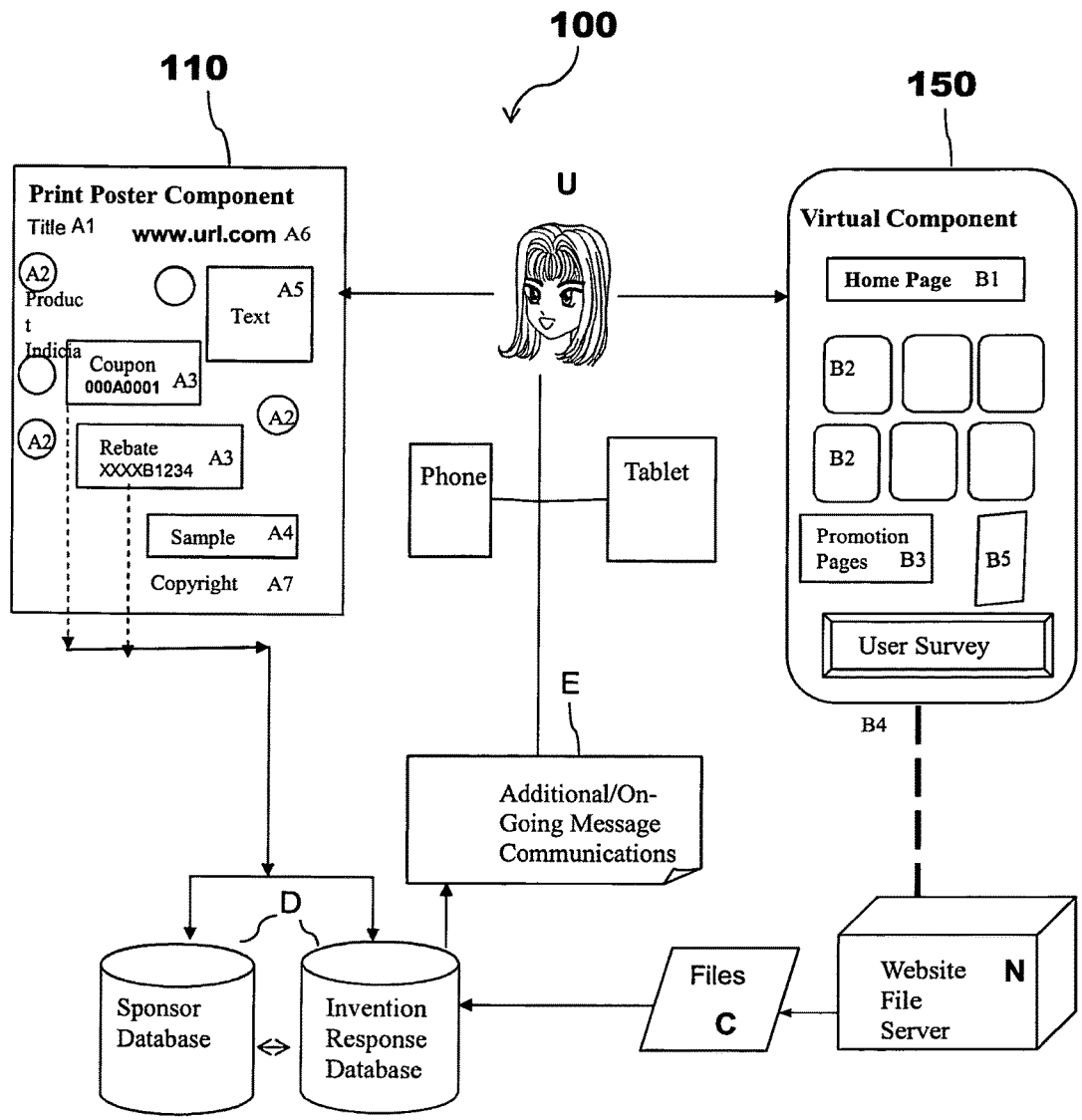
FIG. 16 is an exemplary example of the elements of a collage-based, integrated advertising system according to the present invention.

FIG. 16 is an exemplary example of the elements of a collage-based, integrated advertising system 100. This overview embodiment demonstrates, a physical printed component 110, containing, but not limited to, a Title A1, a variety of product indicia A2, rebate and coupon promotional offers A3, sample(s) A4, text A5, legal notices A7, and a world wide web uniform resource locator (URL) A6, that directs to the (substantially similar) information-providing component 150 or virtual component 150, which is composed of a Home Page B1, advertiser information/application areas B2, promotion pages B3, user survey B4, information gathering forms B5. Tracking codes, server files C and website forms B5 provide usage, information which can be stored in databases D, that can be used to develop and send additional communications E to target audience viewer/users U.

As a non-limiting example and when there are more than one advertiser or sponsor, each advertiser or sponsor can advertise at least one of its, or a third party's, advertising items in or upon the physical component such that each advertiser or sponsor will only have to pay a certain amount or portion, instead of the entire amount, of the advertising fees or costs relating to the advertising project, assignment or campaign. Therefore, the present invention can help to reduce advertising fees or costs. As another non-limiting example and when there are only one advertiser or sponsor, the lone or sole advertiser or sponsor advertises its, or a third party's, advertising items in or upon the physical component such that the lone advertiser will pay the entire amount of the advertising fees or costs.

It is to be understood that the present invention is not limited to the embodiments described above or as shown in the attached figures, but encompasses any and all embodiments within the spirit of the invention.

What is claimed is:

1. A multimodal, collage-based, integrated and interactive advertising system comprising:

an interactive, physical, advertising component displaying a first, pre-designed collage to attract attention of a viewer wherein the viewer will view said first, pre-designed collage and then proceed to interact with said system to obtain information related to said first, pre-designed collage, wherein said first, pre-designed collage is designed by a designer and is comprised of a plurality of advertising items from at least one advertiser or sponsor, wherein said first, pre-designed collage is further comprised of at least one element selected from the group consisting of imagery, iconography, and code that performs at least one task selected from the group consisting of incorporating, initiating and launching at least one augmented reality entity selected from the group consisting of visual effects, spatial calculation, image processing, and dimensionally rendering display technologies, wherein at least one of said advertising items from said first, pre-designed collage connects to an interactive, website or online presence component that displays a second, pre-designed collage, wherein said advertising items from said first, pre-designed collage represent a collection and channel of content that includes at least one entity selected from the group consisting of information, education, utility, entertainment, promotional, and games, wherein said information related to said first, pre-designed collage is at least one information entity selected from the group consisting of information related to the at least one advertiser or sponsor and information related to at least one advertising item of said advertising items, wherein said interactive, physical, advertising component is selected from the group consisting of a sheet printed display, a publication and an advertising structure, wherein said interactive, physical, advertising component provides information directing the viewer to said interactive, website or online presence component so that the viewer is able to obtain said information related to said first, pre-designed collage via a linked, reading device, wherein said interactive, physical advertising component and said interactive, website or online presence component is a dual component, interlinked, interface, with substantially similar theme, subject, content and look and feel, with at least one element in common selected from the group consisting of design logic, operational code, sound and sound components, visual imagery, animation, and related augmented reality display, functionality, operations, tracking, measurement and management, wherein said interactive, physical advertising component's predesigned juxtaposition of said advertising items from said first, pre-designed collage constitute an augmented reality near field communication button array apparatus, operating as a mechanism that helps to prompt engagement of the user, and wherein the viewer moves said linked, reading device over, around or among said advertising items from said first, pre-designed collage causing said linked, reading device to operate as a content selection and transfer device; and said interactive, website or online presence component displaying said second, pre-designed collage that is substantially similar to said first, pre-designed collage of said interactive, physical advertising component for retaining the attention of the viewer, wherein said second, pre-designed collage is designed by the designer and is comprised of a plurality of advertising items from said at least one advertiser or sponsor, wherein the viewer associated said second, pre-designed collage with said first, pre-designed collage, and then proceeds to interact with said interactive, website or online presence component to obtain said information related to said first, pre-designed collage, wherein said interactive, website or online presence component comprises a display component, an information memory component for storing and providing information related to interaction and general operations of components of said advertising system, a processor component for coordinating and managing overall computer and information operations of said advertising system, an information gathering component, an information analysis component, and a communications component, wherein said information gathering component gathers interaction information related to interactions of the viewer with said interactive, physical advertising component and said interactive, website or online presence component, wherein said information analysis component assists tracking and assesses the performance and operations of said interactive, physical advertising component and said interactive, website or online presence component by categorizing and formatting said interaction information that has been gathered, wherein said communications component is used for communicating at least one follow-up communication with the viewer, wherein said first, pre-designed collage comprises at least one launch coded element that launches said second, pre-designed collage and that delivers said second, pre-designed collage in a virtual Home Page form to a screen of said linked, reader device, wherein said Home Page form delivered to said linked, reading device contains a navigational metaphor aligning, matching, corresponding and correlating with said advertising items of said first, pre-designed collage, wherein selecting a corresponding element of a collage element of said second, pre-designed collage links to additional information related to said selected element of said first, pre-designed collage, and wherein at least one of said advertising items is selected from the group consisting of actual, realistic, abstracted, adapted, image manipulated, transfigured, enhanced, sensory stimulating, trans-morphed, specialty rendered, clue offering, literarily influenced, word played, specialty printed, and specialty finished.

2. The multimodal, collage-based, integrated and interactive advertising system according to claim 1, wherein said publication is selected from the group consisting of a poster, a brochure, a component of a magazine, a component of a newspaper, and any combination thereof, and wherein said advertising structure is selected from the group consisting of a billboard, an advertising structure at a banking center, a support structure at a banking center, an advertising structure at a transportation center, a support structure at a transportation center, an advertising structure at an education center, a support structure at an education center, an advertising structure at an arts center, a support structure at an arts center, an advertising structure at a sports venue, a support structure at a sports venue, an advertising structure at an entertainment center, a support structure at an entertainment center, an advertising structure at a dining establishment, a support structure at a dining establishment, an advertising structure at a mercantile venue, a support structure at a mercantile venue, an advertising structure at a trading venue, a support structure at a trading venue, an advertising structure at a retailing venue, a support structure at a retailing venue, an advertising structure at a corporate venue, a support structure at a corporate venue, an advertising structure at a special event, a support structure at a special event, an advertising structure at a public venue, a support structure at a public venue, and any combination thereof.

3. The multimodal, collage-based, integrated and interactive advertising system according to claim 2, wherein said publication is a poster.

4. The multimodal, collage-based, integrated and interactive advertising system according to claim 1, wherein said advertising items are expressed through at least one element selected from the group consisting of text, a statement, an image, a graphic, a photo, a sign, a symbol, iconography, a sound, a smell, a texture, a flavor, a research-related element, a motion picture, an engagement device, an activity, a specialty production technique, and any combination thereof.

5. The multimodal, collage-based, integrated and interactive advertising system according to claim 1, wherein said advertising items are portrayed in a manner selected from the group consisting of actual, realistic, altered, adapted, abstracted, interpreted, and any combination thereof.

6. The multimodal, collage-based, integrated and interactive advertising system according to claim 1, wherein said advertising items are selected from the group consisting of a Uniform Resource Locator, a # tag, a product image, a product depiction, a product picture, a product symbol, a product graphic, a branding iconography, a 3-D image, a slogan, a motto, a description, a title, a headline, an editorial copy, a commentary, a publicity message, a public service announcement, a song or portion thereof, a jingle, a tagline, a poem, a limerick, a mascot, a characterization, an audio tone, an animation, a video, a scent, a game, a puzzle, a riddle, a coded item, a quick response code, a snap code, a meme, a paper thumb drive, an artificial reality message, a near field communication message, a tweet, a schedule, a calendar, a list, a coupon, a rebate, a free offer, a discount offer, a sales offer, a trading offer, a list of products, a list of features, a sweepstakes, a contest, a sample, a sales promotion technique, a trademark, a service mark, a legal notice, a warranty, a guarantee, and any combination thereof.

7. The multimodal, collage-based, integrated and interactive advertising system according to claim 1, wherein each of said first, pre-designed collage and said second, pre-designed collage is a unified, scenic pictorial collage.

8. The multimodal, collage-based, integrated and interactive advertising system according to claim 1, wherein at least one of said interactive, physical, advertising component and said interactive, website or online presence component is navigable via at least one entity selected from the group consisting of a sensory recognition entity, a sensory input entity, and an activity guiding entity.

9. The multimodal, collage-based, integrated and interactive advertising system according to claim 1, wherein the extent to which said advertising items are expressed via said first, pre-designed collage on said interactive, physical, advertising component and said second, pre-designed collage on said interactive, website or online presence component relates to the amount of payment made by said at least one advertiser or sponsor to a publisher of said interactive, physical, advertising component and said interactive, website or online presence component, either separately or in conjunction.

10. The multimodal, collage-based, integrated and interactive advertising system according to claim 1, wherein each of said first, pre-designed collage and said second, pre-designed collage displays a thematically-designed scenario of said plurality of advertising items from said at least one advertiser or sponsor.

11. The multimodal, collage-based, integrated and interactive advertising system according to claim 1, wherein said second, pre-designed collage is substantially similar to said first, pre-designed collage.

12. The multimodal, collage-based, integrated and interactive advertising system according to claim 1, wherein said second, pre-designed collage is a navigational element for the viewer to interact with so as to access said information related to said first, pre-designed collage.

13. The multimodal, collage-based, integrated and interactive advertising system according to claim 1, wherein said interactive, physical, advertising component further provides a viewer engagement element to engage the viewer wherein the viewer will interact with said viewer engagement element.

14. The multimodal, collage-based, integrated and interactive advertising system according to claim 13, wherein said viewer engagement element is selected from the group consisting of a scent, a game, a puzzle, a riddle, a coupon, a rebate, a free offer, a discount offer, a sales offer, a trading offer, a sweepstake, a contest, and a sample.

15. The multimodal, collage-based, integrated and interactive advertising system according to claim 1, wherein said publication delivers at least two techniques selected from the group consisting of awareness building, brand association, and experiential marketing.

16. The multimodal, collage-based, integrated and interactive advertising system according to claim 1, wherein said interactive, physical, advertising component and said interactive, website or online presence component are linked awareness attracting, interest engaging, and attention transfer device comprised of a virtual interface as a mechanism of viewer interaction and attention retention, through a matching navigational metaphor of coordinated theme, subject and content, and in look-and-feel that replicates advertising item icons as a viewer clickable hyperlinked button array.

17. The multimodal, collage-based, integrated and interactive advertising system according to claim 1, wherein said first, pre-designed collage and said second, pre-designed collage theme, subject, content, interface, and communications are crafted through human directed planning, development, and design activities, in successively specific rounds of review, refinement, and approval, of said at least one advertiser or sponsor, and results in the creation of issue specific, uniquely designed, collaboratively sponsored, custom commercial multimedia art.

18. The method of advertising according to claim 17, wherein said viewer engagement element is selected from the group consisting of a scent, a game, a puzzle, a riddle, a coupon, a rebate, a free offer, a discount offer, a sales offer, a trading offer, a sweepstake, a contest, and a sample.

19. The multimodal, collage-based, integrated and interactive advertising system according to claim 1, wherein advertiser participation elements, methods and mechanisms are one or more from the group including activity page, activity instructions, rules listing, legal notices, contact us, email, print, frequently asked questions, and help; online submit functionality for the group including online promotion entry form, password, user name, name, address, zip code, phone number, text number, research response, and additional viewer characteristics information; and automated promotion participation status messaging sent to a promotion entered the viewer participant through at least one electronic communication channel which may contain additional advertiser information.

20. The multimodal, collage-based, integrated and interactive advertising system according to claim 1, wherein said information gathering component also performs automated classification and tabulation for activity type, usage timing, performance characterization, information organizing, cataloguing and indexing, data manipulation, individual and group comparative performance analysis and participation review, message formulation and sending, report creation and report generation.

21. The multimodal, collage-based, integrated and interactive advertising system according to claim 1, wherein said information gathering component and said information analysis component gather, record, classify, organize, index, merge and manipulate data; analyze information, compile and generate custom automated reports and recommendations for said interactive, physical, advertising component and said interactive, website or online presence component with said reporting elements including; and viewer visitation, type and number of activities, participation rates, depth of activity, number of completions, rate of completion, activity access, duration and cost metrics of the viewer's individual, group and overall performance, and the operation and administration of said publication.

22. The multimodal, collage-based, integrated and interactive advertising system according to claim 1, wherein said publication is a basis of and a member in a periodical group of at least one selected from the group consisting of series, edition, and collection, with elements-in-common among issues from the group including theme, subject, content, viewer communications, and navigational interface, and other elements that identify said issues as a member of one or more said series, said edition, and said collection.

23. The multimodal, collage-based, integrated and interactive advertising system according to claim 1, wherein commerce opportunities are created for media companies to offer, test and assess cooperative, themed commercial interactive multimedia art regarding; communication effectiveness including product awareness, message delivery, brand recall, brand perception, brand attributes, brand favorability, purchase intent; viewer engagement including gaining awareness, participation prompting, attention retention, and level and duration of interaction; content presentation environment including location, size, shape, color, sound, motion, level and degree of connectivity; and
related content, program and technical performance, meaning transfer effectiveness and viewer appeal.

24. A method of advertising using a multimodal, collage-based, integrated and interactive advertising system, said method of advertising comprising the steps of:
providing an interactive, physical, advertising component that displays a first, pre-designed collage to attract attention of a viewer wherein the viewer will view said first, pre-designed collage and then proceed to interact with said system to obtain information related to said first, pre-designed collage,
wherein said first, pre-designed collage is designed by a designer and is comprised of a plurality of advertising items from at least one advertiser or sponsor,
wherein said first, pre-designed collage is further comprised of at least one element selected from the group consisting of imagery, iconography, and code that performs at least one task selected from the group consisting of incorporating, initiating and launching at least one augmented reality entity selected from the group consisting of visual effects, spatial calculation, image processing, and dimensionally rendering display technologies,
wherein at least one of said advertising items from said first, pre-designed collage connects to an interactive, website or online presence component that displays a second, pre-designed collage, wherein said advertising items from said first, pre-designed collage represent a collection and channel of content that includes at least one entity selected from the group consisting of information, education, utility, entertainment, promotional, and games,
wherein said information related to said first, pre-designed collage is at least one information entity selected from the group consisting of information related to the at least one advertiser or sponsor and information related to at least one advertising item of said advertising items,
wherein said interactive, physical, advertising component is selected from the group consisting of a sheet printed display, a publication and an advertising structure,
wherein said interactive, physical, advertising component provides information directing the viewer to said interactive, website or online presence component so that the viewer is able to obtain said information related to said first, pre-designed collage via a linked, reading device,
wherein said interactive, physical advertising component and said interactive, website or online presence component is a dual component, interlinked, interface, with substantially similar theme, subject, content and look and feel, with at least one element in common selected from the group consisting of design logic, operational code, sound and sound components, visual imagery, animation, and related augmented reality display, functionality, operations, tracking, measurement and management,
wherein said interactive, physical advertising component's predesigned juxtaposition of said advertising items from said first, pre-designed collage constitute an augmented reality neat field communication button array apparatus, operating as a mechanism that helps to prompt engagement of the user, and
wherein the viewer moves said linked, reading device over, around or among said advertising items from said first, pre-designed collage causing said linked, reading device to operate as a content selecting and transfer device; and
providing said interactive, website or online presence component that displays said second, pre-designed collage that is substantially similar to said first, pre-designed collage of said interactive, physical advertising component for retaining the attention of the viewer,
wherein said second, pre-designed collage is designed by the designer and is comprised of a plurality of advertising items from said at least one advertiser or sponsor,
wherein the viewer associates said second, pre-designed collage with said first, pre-designed collage, and then proceeds to interact with said interactive, website or online presence component to obtain said information related to said first, pre-designed collage, wherein said interactive, website or online presence component comprises a display component, an information memory component for storing and providing information related to interaction and general operations of components of said advertising system, a processor component for coordinating and managing overall computer and information operations of said advertising system, an information gathering component, an information analysis component, and a communications component, wherein said information gathering component gathers interaction information related to interactions of the viewer with said interactive, physical advertising component and said interactive, website or online presence component, wherein said information analysis component assists tracking and assesses the performance and operations of said interactive, physical advertising component and said interactive, website or online presence component by categorizing and formatting said interaction information that has been gathered, wherein said communications component is used for communicating at least one follow-up communication with the viewer, wherein said first, pre-designed collage comprises at least one launch coded element that launches said second, pre-designed collage and that delivers said second, pre-designed collage in a virtual Home Page form to a screen of said linked, reader device, wherein said Home Page form delivered to said linked, reading device contains a navigational metaphor aligning, matching, corresponding and correlating with said advertising items of said first, pre-designed collage, wherein selecting a corresponding element of a collage element of said second, pre-designed collage links to additional information related to said selected element of said first, pre-designed collage, and wherein at least one of said advertising items is selected from the group consisting of actual, realistic, abstracted, adapted, image manipulated, transfigured, enhanced, sensory stimulating, trans-morphed, specialty rendered, clue offering, literarily influenced, word played, specialty printed, and specialty finished.

25. The method of advertising according to claim 24, wherein said publication is selected from the group consisting of a poster, a brochure, a component of a magazine, a component of a newspaper, and any combination thereof, and wherein said advertising structure is selected from the group consisting of a billboard, an advertising structure at a banking center, a support structure at a banking center, an advertising structure at a transportation center, a support structure at a transportation center, an advertising structure at an education center, a support structure at an education center, an advertising structure at an arts center, a support structure at an arts center, an advertising structure at a sports venue, a support structure at a sports venue, an advertising structure at an entertainment center, a support structure at an entertainment center, an advertising structure at a dining establishment, a support structure at a dining establishment, an advertising structure at a mercantile venue, a support structure at a mercantile venue, an advertising structure at a trading venue, a support structure at a trading venue, an advertising structure at a retailing venue, a support structure at a retailing venue, an advertising structure at a corporate venue, a support structure at a corporate venue, an advertising structure at a special event, a support structure at a special event, an advertising structure at a public venue, a support structure at a public venue, and any combination thereof.

26. The method of advertising according to claim 25, wherein said publication is a poster.

27. The method of advertising according to claim 24, wherein said advertising items are expressed through at least one element selected from the group consisting of text, a statement, an image, a graphic, a photo, a sign, a symbol, iconography, a sound, a smell, a texture, a flavor, a research-related element, a motion picture, an engagement device, an activity, a specialty production technique, and any combination thereof.

28. The method of advertising according to claim 24, wherein said advertising items are portrayed in a manner selected from the group consisting of actual, realistic, altered, adapted, abstracted, interpreted, and any combination thereof.

29. The method of advertising according to claim 24, wherein said advertising items are selected from the group consisting of a Uniform Resource Locator, a # tag, a product image, a product depiction, a product picture, a product symbol, a product graphic, a branding iconography, a 3-D image, a slogan, a motto, a description, a title, a headline, an editorial copy, a commentary, a publicity message, a public service announcement, a song or portion thereof, a jingle, a tagline, a poem, a limerick, a mascot, a characterization, an audio tone, an animation, a video, a scent, a game, a puzzle, a riddle, a coded item, a quick response code, a snap code, a meme, a paper thumb drive, an artificial reality message, a near field communication message, a tweet, a schedule, a calendar, a list, a coupon, a rebate, a free offer, a discount offer, a sales offer, a trading offer, a list of products, a list of features, a sweepstakes, a contest, a sample, a sales promotion technique, a trademark, a service mark, a legal notice, a warranty, a guarantee, and any combination thereof.

30. The method of advertising according to claim 24, wherein each of said first, pre-designed collage and said second, pre-designed collage displays a thematically-designed scenario of said plurality of advertising items from said at least one advertiser or sponsor.

31. The method of advertising according to claim 24, wherein the said plurality of advertising items displayed on said interactive, physical, advertising component and said interactive, website or online presence component are elements of a multi-advertiser, skill-based information search and retrieval engagement activity from the group including reward-based, prize earning and value providing, from the group including sweepstakes, contest and game, wherein participants in said multi-advertiser, skill-based information search and retrieval engagement activity gather qualifying advertiser information presented through said interactive, physical, advertising component and said interactive, website or online presence component from the group including singly and in combination, and wherein said search and retrieval gathered engagement activity qualifying advertiser information is conveyed via an entry element on said interactive, website or online presence component.

32. The method of advertising according to claim 24, wherein said second, pre-designed collage is substantially similar to said first, pre-designed collage.

33. The method of advertising according to claim 24, wherein each of said first, pre-designed collage and said second, pre-designed collage is a unified, scenic pictorial collage.

34. The method of advertising according to claim 24, wherein said second, pre-designed collage is a navigational element for the viewer to interact with so as to access said information related to said first, pre-designed collage.

35. The method of advertising according to claim 24, wherein said interactive, physical, advertising component further provides a viewer engagement element to engage the viewer wherein the viewer will interact with said viewer engagement element.

36. The method of advertising according to claim 24, wherein said publication delivers at least two techniques selected from the group consisting of awareness building, brand association, and experiential marketing.

37. The method of advertising according to claim 24, wherein said interactive, physical, advertising component and said interactive, website or online presence component are linked awareness attracting, interest engaging, and attention transfer device comprised of a virtual interface as a mechanism of viewer interaction and attention retention, through a matching navigational metaphor of coordinated theme, subject and content, and in look-and-feel that replicates advertising item icons as a viewer clickable hyperlinked button array.

38. The method of advertising according to claim 24, wherein said first, pre-designed collage and said second, pre-designed collage theme, subject, content, interface, and communications are crafted through human directed planning, development, and design activities, in successively specific rounds of review, refinement, and approval, of said at least one advertiser or sponsor, and results in the creation of issue specific, uniquely designed, collaboratively sponsored, custom commercial multimedia art.

39. The method of advertising according to claim 24, wherein advertiser participation elements, methods and mechanisms are one or more from the group including activity page, activity instructions, rules listing, legal notices, contact us, email, print, frequently asked questions, and help; online submit functionality for the group including online promotion entry form, password, user name, name, address, zip code, phone number, text number, research response, and additional viewer characteristics information; and automated promotion participation status messaging sent to a promotion entered the viewer participant through at least one electronic communication channel which may contain additional advertiser information.

40. The method of advertising according to claim 24, wherein said information gathering component also performs automated classification and tabulation for activity type, usage timing, performance characterization, information organizing, cataloguing and indexing, data manipulation, individual and group comparative performance analysis and participation review, message formulation and sending, report creation and report generation.

41. The method of advertising according to claim 24, wherein said information gathering component and said information analysis component gather, record, classify, organize, index, merge and manipulate data; analyze information, compile and generate custom automated reports and recommendations for said interactive, physical, advertising component and said interactive, website or online presence component with said reporting elements including; and viewer visitation, type and number of activities, participation rates, depth of activity, number of completions, rate of completion, activity access, duration and cost metrics of the viewer's individual, group and overall performance, and the operation and administration of said publication.

42. The method of advertising according to claim 24, wherein said publication is a basis of and a member in a periodical group of at least one selected from the group consisting of series, edition, and collection, with elements-in-common among issues from the group including theme, subject, content, viewer communications, and navigational interface, and other elements that identify said issues as a member of one or more said series, said edition, and said collection.

43. The method of advertising according to claim 24, wherein commerce opportunities are created for media companies to offer, test and assess cooperative, themed commercial interactive multimedia art regarding; communication effectiveness including product awareness, message delivery, brand recall, brand perception, brand attributes, brand favorability, purchase intent; viewer engagement including gaining awareness, participation prompting, attention retention, and level and duration of interaction; content presentation environment including location, size, shape, color, sound, motion, level and degree of connectivity; and
  related content, program and technical performance, meaning transfer effectiveness and viewer appeal.

44. A multimodal, collage-based, integrated and interactive advertising system comprising:
  an interactive, physical, advertising component displaying a first, pre-designed collage to attract attention of a viewer wherein the viewer will view said first, pre-designed collage and then proceed to interact with said system to obtain information related to said first, pre-designed collage, and providing a viewer engagement element to engage the viewer wherein the viewer will interact with said viewer engagement element,
  wherein said first, pre-designed collage is designed by a designer and is comprised of a plurality of advertising items from at least one advertiser or sponsor,
  wherein said first, pre-designed collage is further comprised of at least one element selected from the group consisting of imagery, iconography, and code that performs at least one task selected from the group consisting of incorporating, initiating and launching at least one augmented reality entity selected from the group consisting of visual effects, spatial calculation, image processing, an dimensionally rendering display technologies,
  wherein at least one of said advertising items from said first, pre-designed collage connects to an interactive, website or online presence component that displays a second, pre-designed collage, wherein said advertising items from said first, pre-designed collage represents a collection and channel of content that includes at least one entity selected from the group consisting of information, education, utility, entertainment, promotional, and games,
  wherein said information related to said first, pre-designed collage is at least one information entity selected from the group consisting of information related to the at least one advertiser or sponsor and information related to at least one advertising item of said advertising items,
  wherein said interactive, physical, advertising component is selected from the group consisting of a sheet printed display, a publication and an advertising structure,
  wherein said interactive, physical, advertising component further provides information directing the viewer to said interactive, website or online presence component so that the viewer is able to obtain said information related to said first, pre-designed collage via a linked, reading device, wherein said interactive, physical advertising component and said interactive, website or online presence component is a dual component, interlinked interface, with substantially similar theme, subject, content and look and feel, with at least one element in common selected from the group consisting of design logic, operational code, sound and sound components, visual imagery, animation, and related augmented reality display, functionality, operations, tracking, measurement and management, wherein said interactive, physical advertising component's predesigned juxtaposition of said advertising items from said first, pre-designed collage constitute an augmented reality near field communication button array apparatus, operating as a mechanism that helps to prompt engagement of the user, and wherein the viewer moves said linked, reading device over, around or among said advertising items from said first, pre-designed collage causing said linked, reading device to operate as content selecting and transfer device; and said interactive, website or online presence component displaying said second, pre-designed collage that is substantially similar to said first, pre-designed collage of said interactive, physical advertising component for retaining the attention of the viewer, wherein said second, pre-designed collage is designed by the designer and is comprised of a plurality of advertising items from said at least one advertiser or sponsor, wherein the view associates said second, pre-designed collage with said first, pre-designed collage, and then proceeds to interact with said interactive, website or online presence component to obtain said information related to said first, pre-designed collage, wherein said interactive, website or online presence component comprises a display component, an information memory component for storing and providing information related to interaction and general operations of components of said advertising system, a processor component for coordinating and managing overall computer and information operations of said advertising system, an information gathering component, an information analysis component, and a communication component, wherein said information gathering component gathers interaction information related to interactions of the viewer with said interactive, physical advertising component and said interactive, website or online presence component, wherein said information analysis component assists tracking and assesses the performance and operations of said interactive, physical advertising component and said interactive, website or online presence component by categorizing and formatting said interaction information that has been gathered, wherein said communication component is used for communicating at least one follow-up communication with the viewer, wherein said first, pre-designed collage comprises at least one launch coded element that launches said second, pre-designed collage and that delivers said second, pre-designed collage in a virtual Home Page form to a screen of said linked, reader device, wherein said Home Page form delivered to said linked, reading device contains a navigational metaphor aligning, matching, corresponding and correlating with said advertising items of said first, pre-designed collage, wherein selecting a corresponding element of a collage element of said second, pre-designed collage links to additional information related to said selected element of said first, pre-designed collage, and wherein at least one of said advertising items is selected from the group consisting of actual, realistic, abstracted, adapted, adapted, image manipulated, transfigured, enhanced, sensory stimulating, trans-morphed, specialty rendered, clue offering, literarily influenced, word played, specialty printed, and specialty finished.

45. The multimodal, collage-based, integrated and interactive advertising system according to claim 44, wherein said publication is selected from the group consisting of a poster, a brochure, a component of a magazine, a component of a newspaper, and any combination thereof, and wherein said advertising structure is selected from the group consisting of a billboard, an advertising structure at a banking center, a support structure at a banking center, an advertising structure at a transportation center, a support structure at a transportation center, an advertising structure at an education center, a support structure at an education center, an advertising structure at an arts center, a support structure at an arts center, an advertising structure at a sports venue, a support structure at a sports venue, an advertising structure at an entertainment center, a support structure at an entertainment center, an advertising structure at a dining establishment, a support structure at a dining establishment, an advertising structure at a mercantile venue, a support structure at a mercantile venue, an advertising structure at a trading venue, a support structure at a trading venue, an advertising structure at a retailing venue, a support structure at a retailing venue, an advertising structure at a corporate venue, a support structure at a corporate venue, an advertising structure at a special event, a support structure at a special event, an advertising structure at a public venue, a support structure at a public venue, and any combination thereof.

46. The multimodal, collage-based, integrated and interactive advertising system according to claim 44, wherein said first, pre-designed collage displays a thematically-designed scenario of said plurality of advertising items from said at least one advertiser or sponsor.

47. The multimodal, collage-based, integrated and interactive advertising system according to claim 44, wherein said second, pre-designed collage is a navigational element for the viewer to interact with so as to access said information related to said first, pre-designed collage.

48. The multimodal, collage-based, integrated and interactive advertising system according to claim 44, wherein each of said first, pre-designed collage and said second, pre-designed collage is a unified, scenic pictorial collage.

49. The multimodal, collage-based, integrated and interactive advertising system according to claim 44, wherein said viewer engagement element is selected from the group consisting of a scent, a game, a puzzle, a riddle, a coupon, a rebate, a free offer, a discount offer, a sales offer, a trading offer, a sweepstake, a contest, and a sample.

50. The multimodal, collage-based, integrated and interactive advertising system according to claim 44, wherein said publication delivers at least two techniques selected from the group consisting of awareness building, brand association, and experiential marketing.

51. The multimodal, collage-based, integrated and interactive advertising system according to claim 44, wherein said interactive, physical, advertising component and said interactive, website or online presence component are linked awareness attracting, interest engaging, and attention transfer device comprised of a virtual interface as a mechanism of viewer interaction and attention retention, through a matching navigational metaphor of coordinated theme, subject and content, and in look-and-feel that replicates advertising item icons as a viewer clickable hyperlinked button array.

52. The multimodal, collage-based, integrated and interactive advertising system according to claim 44, wherein said first, pre-designed collage and said second, pre-designed collage theme, subject, content, interface, and communications are crafted through human directed planning, development, and design activities, in successively specific rounds of review, refinement, and approval, of said at least one advertiser or sponsor, and results in the creation of issue specific, uniquely designed, collaboratively sponsored, custom commercial multimedia art.

53. The multimodal, collage-based, integrated and interactive advertising system according to claim 44, wherein advertiser participation elements, methods and mechanisms are one or more from the group including activity page, activity instructions, rules listing, legal notices, contact us, email, print, frequently asked questions, and help; online submit functionality for the group including online promotion entry form, password, user name, name, address, zip code, phone number, text number, research response, and additional viewer characteristics information; and automated promotion participation status messaging sent to a promotion entered the viewer participant through at least one electronic communication channel which may contain additional advertiser information.

54. The multimodal, collage-based, integrated and interactive advertising system according to claim 44, wherein said information gathering component also performs automated classification and tabulation for activity type, usage timing, performance characterization, information organizing, cataloguing and indexing, data manipulation, individual and group comparative performance analysis and participation review, message formulation and sending, report creation and report generation.

55. The multimodal, collage-based, integrated and interactive advertising system according to claim 44, wherein said information gathering component and said information analysis component gather, record, classify, organize, index, merge and manipulate data; analyze information, compile and generate custom automated reports and recommendations for said interactive, physical, advertising component and said interactive, website or online presence component with said reporting elements including; and viewer visitation, type and number of activities, participation rates, depth of activity, number of completions, rate of completion, activity access, duration and cost metrics of the viewer's individual, group and overall performance, and the operation and administration of said publication.

56. The multimodal, collage-based, integrated and interactive advertising system according to claim 44, wherein said publication is a basis of and a member in a periodical group of at least one selected from the group consisting of series, edition, and collection, with elements-in-common among issues from the group including theme, subject, content, viewer communications, and navigational interface, and other elements that identify said issues as a member of one or more said series, said edition, and said collection.

57. The multimodal, collage-based, integrated and interactive advertising system according to claim 44, wherein commerce opportunities are created for media companies to offer, test and assess cooperative, themed commercial interactive multimedia art regarding; communication effectiveness including product awareness, message delivery, brand recall, brand perception, brand attributes, brand favorability, purchase intent; viewer engagement including gaining awareness, participation prompting, attention retention, and level and duration of interaction; content presentation environment including location, size, shape, color, sound, motion, level and degree of connectivity; and related content, program and technical performance, meaning transfer effectiveness and viewer appeal.

* * * * *